United States Patent
Lyu et al.

(10) Patent No.: US 10,159,095 B2
(45) Date of Patent: Dec. 18, 2018

(54) RANDOM ACCESS METHOD AND RELATED APPARATUS

(71) Applicant: Huawei Technologies Co., Ltd., Shenzhen (CN)

(72) Inventors: Yongxia Lyu, Beijing (CN); Wei Quan, Beijing (CN); Xiaodong Yang, Beijing (CN); Chaojun Li, Beijing (CN); Bo Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 15/143,559

(22) Filed: Apr. 30, 2016

(65) Prior Publication Data

US 2016/0249386 A1 Aug. 25, 2016

Related U.S. Application Data

(63) Continuation of application No. PCT/CN2013/086458, filed on Nov. 1, 2013.

(51) Int. Cl.
| | | |
|---|---|---|
| *H04W 74/08* | (2009.01) | |
| *H04W 74/06* | (2009.01) | |
| *H04L 5/14* | (2006.01) | |
| *H04W 72/04* | (2009.01) | |

(52) U.S. Cl.
CPC ........... *H04W 74/0833* (2013.01); *H04L 5/14* (2013.01); *H04W 72/042* (2013.01); *H04W 74/06* (2013.01)

(58) Field of Classification Search
CPC .. H04L 5/14; H04W 74/0833; H04W 72/042; H04W 74/06
See application file for complete search history.

(56) References Cited

U.S. PATENT DOCUMENTS

| 2009/0156194 A1* | 6/2009 | Meylan ............. H04W 74/0833 455/422.1 |
| 2013/0083706 A1 | 4/2013 | Lin |

(Continued)

FOREIGN PATENT DOCUMENTS

| CN | 101621849 A | 1/2010 |
| CN | 103312462 A | 9/2013 |

(Continued)

OTHER PUBLICATIONS

LTE Advanced, "3rd Generation Partnership Project; Technical Specification Group Radio Access Network; Evolved Universal Terrestrial Radio Access (E-UTRA); Multiplexing and Channel Coding (Release 11)", 3GPP TS 36.212, V113.0, Jun. 2013, Technical Specification, 84 pages.

(Continued)

*Primary Examiner* — Chi H Pham
*Assistant Examiner* — Weibin Huang
(74) *Attorney, Agent, or Firm* — Slater Matsil, LLP

(57) ABSTRACT

A random access method and a related apparatus are disclosed. A user equipment receives first signaling from a base station through a physical downlink shared channel (PDSCH), and receives second signaling from the base station through a physical downlink control channel (PDCCH) or an enhanced physical downlink control channel (ePDCCH), where the first signaling includes a first time division duplexing TDD uplink-downlink configuration, and the second signaling includes a second TDD uplink-downlink configuration; the user equipment determines, according to the first TDD uplink-downlink configuration, an uplink subframe for sending a random access message; and the user equipment sends the random access message to the base station in the determined uplink subframe.

18 Claims, 14 Drawing Sheets

(56) References Cited

U.S. PATENT DOCUMENTS

| | | | | |
|---|---|---|---|---|
| 2013/0343307 A1* | 12/2013 | Desai | .................... | H04W 74/04 370/329 |
| 2014/0355539 A1* | 12/2014 | Yang | .................. | H04W 74/008 370/329 |
| 2015/0043392 A1* | 2/2015 | Susitaival | ............ | H04L 5/1469 370/280 |
| 2015/0117294 A1* | 4/2015 | Li | ..................... | H04W 72/0446 370/312 |

FOREIGN PATENT DOCUMENTS

| | | | |
|---|---|---|---|
| CN | 103378963 | A | 10/2013 |
| RU | 2463743 | C2 | 10/2012 |
| WO | 2007003333 | A1 | 1/2007 |
| WO | 2013095004 | A1 | 6/2013 |

OTHER PUBLICATIONS

LTE Advanced, "3rd Generation Partnership Project; Technical Specification Group Radio Access Network; Evolved Universal Terrestrial Radio Access (E-UTRA); Physical Layer Procedures (Release 11)", 3GPP TS 36.213, V11.4.0, Sep. 2013, Technical Specification, 182 pages.

LTE Advanced, "3rd Generation Partnership Project; Technical Specification Group Radio Access Network; Evolved Universal Terrestrial Radio Access (E-UTRA); Medium Access Control (MAC) Protocol Specification (Release 11)", 3GPP TS 36.321, V11.3.0, Jun. 2013, Technical Specification, 57 pages.

LTE Advanced, "3rd Generation Partnership Project; Technical Specification Group Radio Access Network; Evolved Universal Terrestrial Radio Access (E-UTRA); Radio Resource Control (RRC) ; Protocol Specification (Release 11)," 3GPP TS 36.331, V11.5.0, Sep. 2013, Technical Specification, 347 pages.

Panasonic, LGE, Samsung, CATT, Reconfiguration,"Way Forward on Signalling for TFF UL/DL Reconfiguration," Agenda Item: 7.2.1.2, 3GPP TSG-RAN WG1 Meeting 74bis, R1-134906, Guangzhou, China, Oct. 7-11, 2013, 2 pages.

Huawei, Hisilicon, "eIMTA Impact on RAN2," Agenda Item: 7.8, 3GPP TSG-RAN WG2 Meeting #83bis, R2-133386, Ljubljana, Slovenia, Oct. 7-11, 2013, 4 pages.

* cited by examiner

RANDOM ACCESS METHOD AND RELATED APPARATUS

This application is a continuation of International Application No. PCT/CN2013/086458, filed on Nov. 1, 2013, which is hereby incorporated by reference in its entirety.

TECHNICAL FIELD

The present invention relates to the field of communications technologies, and in particular, to a random access method and a related apparatus.

BACKGROUND

A Long Term Evolution (LTE) system supports a time division duplexing (TDD) mode, that is, an uplink (UL) and a downlink (DL) use different time slots of a same frequency. An LTE TDD system may semi-statically configure uplink-downlink configurations according to service types, to meet different asymmetric uplink-downlink service requirements.

In the LTE TDD system, a used uplink-downlink configuration is semi-statically configured, and the configuration is changed at least every 640 milliseconds (ms), which may result in mismatching between a current uplink-downlink configuration and instantaneous uplink-downlink traffic. Therefore, resources cannot be utilized effectively, and this problem is especially serious for a cell with a relatively small number of user equipments. Therefore, in order to effectively improve a resource utilization rate, in a system of a new release, a TDD uplink-downlink configuration may be dynamically changed, for example, the uplink-downlink configuration is changed every 10 ms to 40 ms, and a base station (e.g., eNodeB (eNB)) notifies the TDD uplink-downlink configuration through a conventional physical downlink control channel (PDCCH) or an enhanced physical downlink control channel (ePDCCH). In the following, unless otherwise stated, a physical layer downlink control channel refers to the conventional physical downlink control channel or the enhanced physical downlink control channel (ePDCCH), and the physical layer downlink control channel may be abbreviated as (e)PDCCH. Because the (e)PDCCH is dynamic, the TDD uplink-downlink configuration can be dynamically changed. A user equipment that supports a function of dynamically changing the TDD uplink-downlink configuration is referred to as a further enhancements to LTE TDD for downlink-uplink interference management and traffic adaptation (eIMTA) user equipment, and is referred to as an eIMTA function-enabled user equipment in the specification for simplicity.

Because eIMTA user equipments and user equipments that do not enable an eIMTA function coexist in a communications network, where the user equipments that do not enable an eIMTA function include at least user equipments (UE) of releases prior to the 3rd Generation Partnership Project Release 12 (3GPP R12) and user equipments, which do not have an eIMTA function, of the 3GPP R12 and later. After sending a same preamble (also referred to as a prefix or a pilot) on a same random access channel (RACH) resource and receiving a random access message 2 (a random access response) on a same downlink resource, an eIMTA function-enabled user equipment and a non-eIMTA user equipment send random access messages 3 (which may be abbreviated as Msg3) according to a timing relationship specified in an existing protocol. The existing protocol specifies the following: It is assumed that the random access response is received in a subframe n, and then the Msg3 is sent in a first uplink subframe n+k1, where k1>=6, and subframes are labeled as 0 to 9. When a value of an uplink delay field in a random access response grant is 0, the subframe n+k1 is a first available uplink subframe (available UL subframe). When the value of the uplink delay field in the random access response grant is 1, the Msg3 is sent in a first available uplink subframe after the subframe n+k1. The eIMTA user equipment determines n+k1 according to a TDD uplink-downlink configuration notified on the (e)PDCCH, in other words, determines a subframe for sending the Msg3, according to a TDD uplink-downlink configuration notified on the (e)PDCCH, but the user equipment that does not enable an eIMTA function determines n+k1 according to a TDD uplink-downlink configuration notified in a system information block 1 (SIB1), in other words, determines a subframe for sending the Msg3, according to a TDD uplink-downlink configuration notified in a system information block 1 (system information block1, SIB1). Further, the TDD uplink-downlink configuration notified on the (e)PDCCH and the TDD uplink-downlink configuration notified in the SIB1 may be different. Because a base station does not know whether the user equipment that sends the preamble is an eIMTA function-enabled user equipment or a user equipment that does not enable an eIMTA function before correctly receiving the RACH Msg3, the base station does not know which configuration based on which the user equipment determines n+k1 or the uplink subframe for sending the Msg3. In this way, the user equipment that does not enable an eIMTA function, the eIMTA function-enabled user equipment, and the base station may have inconsistent understanding about the uplink subframe for sending the Msg3, so that it is possible that the base station fails to receive the corresponding Msg3.

In view of the above, in a random access process, how to enable a base station to accurately receive random access messages 3 sent by the eIMTA function-enabled user equipment and the user equipment that does not enable an eIMTA function becomes a problem that needs to be solved urgently at present.

SUMMARY

Embodiments of the present invention provide a random access method and a related apparatus, which can enable a base station to accurately receive random access messages sent by a user equipment that does not enable an eIMTA function and an eIMTA function-enabled user equipment.

According to a first aspect, a random access method is provided and includes receiving first signaling, which is sent by a base station to an eIMTA function-enabled user equipment through a physical downlink shared channel PDSCH, and receiving second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration. The method further includes determining, by the eIMTA function-enabled user equipment according to the first TDD uplink-downlink configuration, an uplink subframe for sending a random access message. The method further includes sending, by the eIMTA function-enabled user equipment, the random access message to the base station in the determined uplink subframe.

In a first possible implementation manner, before the sending, by the eIMTA function-enabled user equipment, the random access message to the base station in the determined uplink subframe, the method further includes sending, by the eIMTA function-enabled user equipment, a preamble to the base station on an uplink subframe set of the first TDD uplink-downlink configuration.

With reference to the first possible implementation manner of the first aspect, in a second possible implementation manner, before the sending, by the eIMTA function-enabled user equipment, a preamble to the base station on an uplink subframe set of the first TDD uplink-downlink configuration, the method further includes listening, by the eIMTA function-enabled user equipment on a downlink subframe set of the second TDD uplink-downlink configuration, to a physical downlink control channel order PDCCH Order or an enhanced physical downlink control channel order ePDCCH Order sent by the base station. Alternatively, the method includes listening, by the eIMTA function-enabled user equipment on a downlink subframe set of the first TDD uplink-downlink configuration, to a PDCCH Order or an ePDCCH Order sent by the base station.

With reference to the first aspect or the first possible implementation manner of the first aspect or the second possible implementation manner of the first aspect, in a third possible implementation manner, before the sending, by the eIMTA function-enabled user equipment, the random access message to the base station in the determined uplink subframe, the method further includes: listening, by the eIMTA function-enabled user equipment on the downlink subframe set of the first TDD uplink-downlink configuration, to downlink control information DCI that is sent by the base station through the PDCCH or the ePDCCH and is scrambled by using a random access-radio network temporary identifier RA-RNTI.

With reference to the first aspect or the first possible implementation manner of the first aspect or the second possible implementation manner of the first aspect or the third possible implementation manner of the first aspect, in a fourth possible implementation manner, after the sending the random access message to the base station in the determined uplink subframe, the method further includes: receiving, by the eIMTA function-enabled user equipment on the downlink subframe set of the second TDD uplink-downlink configuration, a contention resolution message sent by the base station; or receiving, by the eIMTA function-enabled user equipment on the downlink subframe set of the first TDD uplink-downlink configuration, a contention resolution message sent by the base station.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner, the first signaling is a system information block.

According to a second aspect, a random access method is provided and includes sending first signaling to an eIMTA function-enabled user equipment through a physical downlink shared channel PDSCH, and sending second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration; and receiving a random access message, which is sent by the eIMTA function-enabled user equipment in an uplink subframe determined according to the first TDD uplink-downlink configuration.

In a first possible implementation manner, before the receiving a random access message, which is sent by the eIMTA function-enabled user equipment in an uplink subframe determined according to the first TDD uplink-downlink configuration, the method further includes: sending a physical downlink control channel order PDCCH Order or an enhanced physical downlink control channel order ePDCCH Order to the eIMTA function-enabled user equipment on a downlink subframe set of the second TDD uplink-downlink configuration; or sending a PDCCH Order or an ePDCCH Order to the eIMTA function-enabled user equipment on a downlink subframe set of the first TDD uplink-downlink configuration.

With reference to the second aspect or the first possible implementation manner of the second aspect, in a second possible implementation manner, before the receiving a random access message, which is sent by the eIMTA function-enabled user equipment in an uplink subframe determined according to the first TDD uplink-downlink configuration, the method further includes sending, on the downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

With reference to the second aspect or the first possible implementation manner of the second aspect or the second possible implementation manner of the second aspect, in a third possible implementation manner, after the receiving a random access message 3, which is sent by the eIMTA function-enabled user equipment in a first uplink subframe determined according to the first TDD uplink-downlink configuration, the method further includes: sending a contention resolution message to the eIMTA function-enabled user equipment on the downlink subframe set of the second TDD uplink-downlink configuration; or sending a contention resolution message to the eIMTA function-enabled user equipment on the downlink subframe set of the first TDD uplink-downlink configuration.

With reference to the second aspect or the first possible implementation manner of the second aspect or the second possible implementation manner of the second aspect or the third possible implementation manner of the second aspect, in a fourth possible implementation manner, the first signaling is a system information block.

According to a third aspect, an eIMTA function-enabled user equipment is provided and includes: a receiving unit, configured to receive first signaling, which is sent by a base station to the eIMTA function-enabled user equipment through a physical downlink shared channel PDSCH, and receive second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration. A determining unit is configured to determine, according to the first TDD uplink-downlink configuration, an uplink subframe for sending a random access message. A sending unit is configured to send the random access message 3 to the base station in the determined uplink subframe.

In a first possible implementation manner, the sending unit is further configured to send a preamble to the base station on an uplink subframe set of the first TDD uplink-downlink configuration.

With reference to the first possible implementation manner of the third aspect, in a second possible implementation manner, the receiving unit is further configured to listen, on a downlink subframe set of the second TDD uplink-downlink configuration, to a physical downlink control channel order PDCCH Order or an enhanced physical downlink control channel order ePDCCH Order sent by the base station; or the receiving unit is further configured to listen, on a downlink subframe set of the first TDD uplink-downlink configuration, to a PDCCH Order or an ePDCCH Order sent by the base station.

With reference to the third aspect or the first possible implementation manner of the third aspect or the second possible implementation manner of the third aspect, in a third possible implementation manner, the receiving unit is further configured to listen, on the downlink subframe set of the first TDD uplink-downlink configuration, to downlink control information DCI that is sent by the base station through the PDCCH or the ePDCCH and is scrambled by using a random access-radio network temporary identifier RA-RNTI.

With reference to the third aspect or the first possible implementation manner of the third aspect or the second possible implementation manner of the third aspect or the third possible implementation manner of the third aspect, in a fourth possible implementation manner, the receiving unit is further configured to receive, on the downlink subframe set of the second TDD uplink-downlink configuration, a contention resolution message sent by the base station; or the receiving unit is further configured to receive, on the downlink subframe set of the first TDD uplink-downlink configuration, a contention resolution message sent by the base station.

With reference to the third aspect or the first possible implementation manner of the third aspect or the second possible implementation manner of the third aspect or the third possible implementation manner of the third aspect or the fourth possible implementation manner of the third aspect, in a fifth possible implementation manner, the first signaling is a system information block.

According to a fourth aspect, a base station is provided and includes: a sending unit, configured to send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration. A receiving unit is configured to receive a random access message, which is sent by an eIMTA function-enabled user equipment in an uplink subframe determined according to the first TDD uplink-downlink configuration.

In a first possible implementation manner, the sending unit is further configured to send a physical downlink control channel order PDCCH Order or an enhanced physical downlink control channel order ePDCCH Order to the eIMTA function-enabled user equipment on a downlink subframe set of the second TDD uplink-downlink configuration. The sending unit is further configured to send a PDCCH Order or an ePDCCH Order to the eIMTA function-enabled user equipment on a downlink subframe set of the first TDD uplink-downlink configuration.

With reference to the fourth aspect or the first possible implementation manner of the fourth aspect, in a second possible implementation manner, the sending unit is further configured to send, on the downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

With reference to the fourth aspect or the first possible implementation manner of the fourth aspect or the second possible implementation manner of the fourth aspect, in a third possible implementation manner, the sending unit is further configured to send a contention resolution message to the eIMTA function-enabled user equipment on the downlink subframe set of the second TDD uplink-downlink configuration. Alternatively the sending unit is further configured to send a contention resolution message to the eIMTA function-enabled user equipment on the downlink subframe set of the first TDD uplink-downlink configuration.

With reference to the fourth aspect or the first possible implementation manner of the fourth aspect or the second possible implementation manner of the fourth aspect or the third possible implementation manner of the fourth aspect, in a fourth possible implementation manner, the first signaling is a system information block 1.

According to a fifth aspect, an eIMTA function-enabled user equipment is provided and includes: a receiver, configured to receive first signaling, which is sent by a base station to the eIMTA function-enabled user equipment through a physical downlink shared channel PDSCH, and receive second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration; a processor, configured to determine, according to the first TDD uplink-downlink configuration, an uplink subframe for sending a random access message; and a transmitter, configured to send the random access message 3 to the base station in the determined uplink subframe.

In a first possible implementation manner, before the transmitter executes the step of sending the random access message to the base station in the determined uplink subframe, the transmitter is further configured to execute the following step: sending a preamble to the base station on an uplink subframe set of the first TDD uplink-downlink configuration.

With reference to the first possible implementation manner of the fifth aspect, in a second possible implementation manner, before the transmitter executes the step of sending a preamble to the base station on an uplink subframe set of the first TDD uplink-downlink configuration, the receiver is further configured to execute the following step: listening, on a downlink subframe set of the second TDD uplink-downlink configuration, to a physical downlink control channel order PDCCH Order or an enhanced physical downlink control channel order ePDCCH Order sent by the base station; or listening, on a downlink subframe set of the first TDD uplink-downlink configuration, to a PDCCH Order or an ePDCCH Order sent by the base station.

With reference to the fifth aspect or the first possible implementation manner of the fifth aspect or the second possible implementation manner of the fifth aspect, in a third possible implementation manner, before the transmitter executes the step of sending the random access message 3 to the base station in the determined uplink subframe, the receiver is further configured to execute the following step: listening, on the downlink subframe set of the first TDD uplink-downlink configuration, to downlink control information DCI that is sent by the base station through the PDCCH or the ePDCCH and is scrambled by using a random access-radio network temporary identifier RA-RNTI.

With reference to the fifth aspect or the first possible implementation manner of the fifth aspect or the second possible implementation manner of the fifth aspect or the third possible implementation manner of the fifth aspect, in a fourth possible implementation manner, after the transmitter executes the step of sending the random access message 3 to the base station in the determined uplink subframe, the receiver is further configured to execute the following step: receiving, on the downlink subframe set of the second TDD uplink-downlink configuration, a contention resolution message sent by the base station; or receiving, on the downlink subframe set of the first TDD uplink-downlink configuration, a contention resolution message sent by the base station.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner, the first signaling is a system information block.

According to a sixth aspect, a base station is provided and includes: a transmitter, configured to send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration. A receiver is configured to receive a random access message 3, which is sent by the eIMTA function-enabled user equipment in an uplink subframe determined according to the first TDD uplink-downlink configuration.

In a first possible implementation manner, before the receiver executes the step of receiving a random access message, which is sent by the eIMTA function-enabled user equipment in an uplink subframe determined according to the first TDD uplink-downlink configuration, the transmitter is further configured to execute the following step: sending a physical downlink control channel order PDCCH Order or an enhanced physical downlink control channel order ePDCCH Order to the eIMTA function-enabled user equipment on a downlink subframe set of the second TDD uplink-downlink configuration; or sending a PDCCH Order or an ePDCCH Order to the eIMTA function-enabled user equipment on a downlink subframe set of the first TDD uplink-downlink configuration.

With reference to the sixth aspect or the first possible implementation manner of the sixth aspect, in a second possible implementation manner, before the receiver executes the step of receiving a random access message 3, which is sent by the eIMTA function-enabled user equipment in a first uplink subframe determined according to the first TDD uplink-downlink configuration, the transmitter is further configured to execute the following step: sending, on the downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

With reference to the sixth aspect or the first possible implementation manner of the sixth aspect or the second possible implementation manner of the sixth aspect, in a third possible implementation manner, after the receiver executes the step of receiving a random access message, which is sent by the eIMTA function-enabled user equipment in a first uplink subframe determined according to the first TDD uplink-downlink configuration, the transmitter is further configured to execute the following step: sending a contention resolution message to the eIMTA function-enabled user equipment on the downlink subframe set of the second TDD uplink-downlink configuration; or sending a contention resolution message to the eIMTA function-enabled user equipment on the downlink subframe set of the first TDD uplink-downlink configuration.

With reference to the sixth aspect or the first possible implementation manner of the sixth aspect or the second possible implementation manner of the sixth aspect or the third possible implementation manner of the sixth aspect, in a fourth possible implementation manner, the first signaling is a system information block.

According to the technical solutions of a random access method and a related apparatus provided by the present invention, both a user equipment that does not enable an eIMTA function and an eIMTA function-enabled user equipment send random access messages 3 by uniformly using an uplink subframe determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An existing LTE TDD system has seven configurations, and refer to Table 1 below for details, where D represents downlink, U represents uplink, S represents a special subframe, and the special subframe includes a downlink pilot time slot (DWPTS), a guard period (GP), and an uplink pilot time slot (UPPTS).

TABLE 1

Uplink-downlink configuration

| Index of an uplink-downlink configuration | Downlink-to-uplink switching cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 1A:
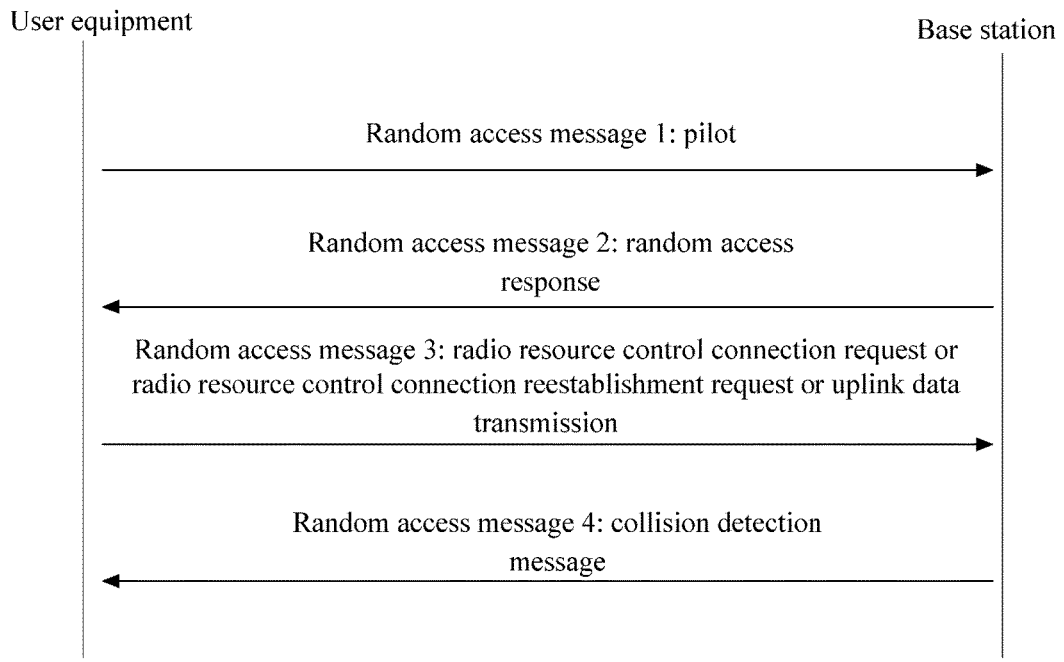
FIG. 1a is a flowchart of a random access process in a contention mode.
Figure 1B:
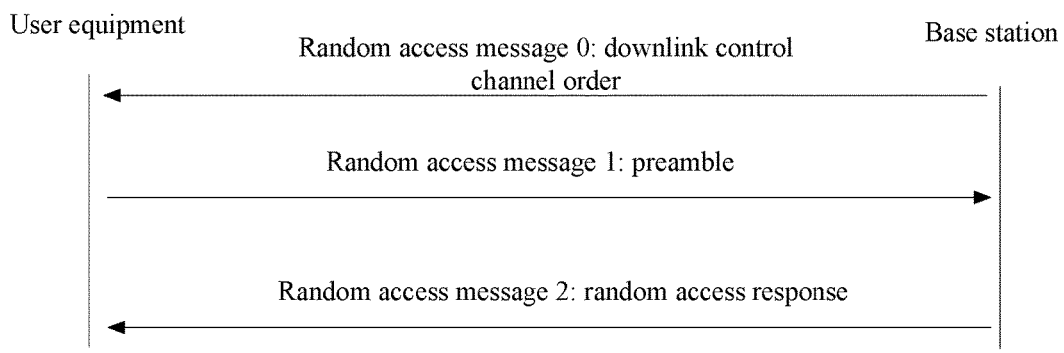
FIG. 1b is a flowchart of a random access process in a non-contention mode.

A random access process in the LTE TDD system includes a random access process in a contention mode and a random access process in a non-contention mode. The random access process in the contention mode is shown in FIG. 1a, and a schematic diagram of the random access process in the non-contention mode is shown in FIG. 1b. The random access process in the contention mode includes that a UE sends a random access message 1 (which may be abbreviated as Msg1), that is, a preamble. After correctly receiving the preamble, an eNodeB sends a random access message 2 (which may be abbreviated as Msg2), that is, a random access response (radio access channel (RACH) response, RAR), where the random access response includes: a timing advance, a random access response grant (for indicating transmission information of a subsequent Msg3), and an allocated temporary user identifier (e.g., cell radio network temporary identifier (C-RNTI)). After the UE correctly receives the Msg2, the UE sends the Msg3 on a physical uplink shared channel (PUSCH) indicated by the random access response grant in the Msg2. In an initial random access process, the Msg3 is a radio resource control (RRC) connection request. A random access message 3 initiated after a radio link failure may be an RRC connection reestablishment request, may also be a resource request MAC control element (Medium access control control element, MAC CE), or may further be a handover acknowledgment message. After correctly receiving the Msg3, the eNB returns a random access message 4 (Msg4 for short) to the UE on a physical downlink shared channel (PDSCH), where the access message 4 may be a collision detection message or the like. Compared with the random access process in the contention mode, the random access process in the non-contention mode includes neither the message 3 nor a contention resolution message because there is no contention. In addition, the random access process in the non-contention mode further includes a random access message 0 (Msg0), where the Msg0 may be a downlink control channel order ((e)PDCCH order), or may further be a handover command, and the (e)PDCCH order includes a preamble sequence number and the like.

Figure 2:
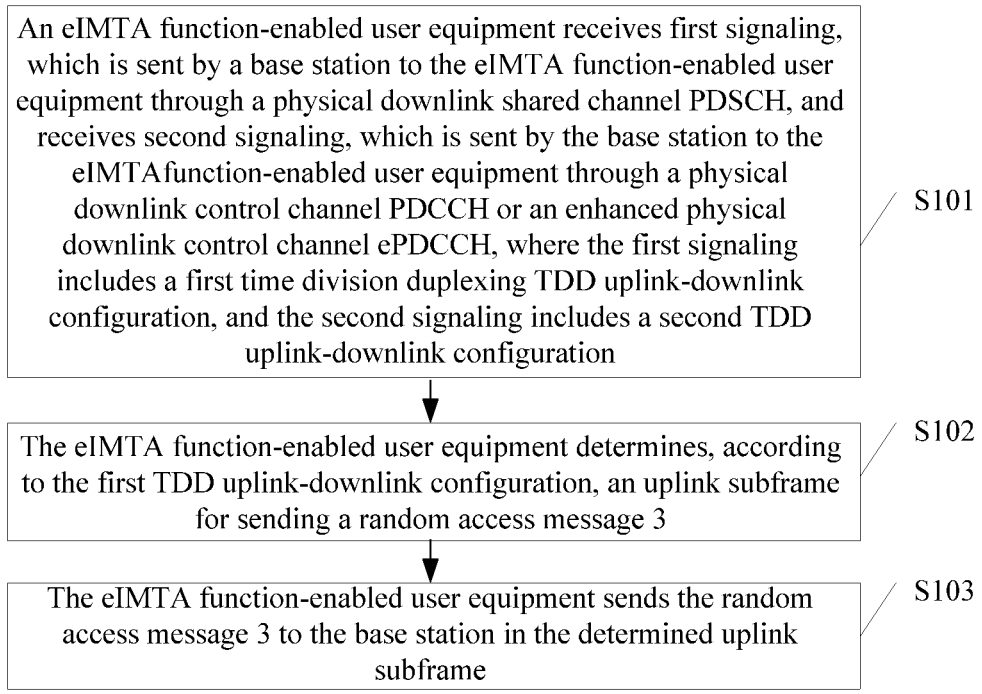
FIG. 2 is a flowchart of a first embodiment of a random access method according to the present invention.

FIG. 2 is a flowchart of a first embodiment of a random access method according to the present invention. As shown in FIG. 2, the method includes the following steps:

Step S101: An eIMTA user equipment receives first signaling, which is sent by a base station to the eIMTA function-enabled user equipment through a physical downlink shared channel PDSCH, and receives second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

Both an eIMTA function-enabled user equipment and a user equipment that does not enable an eIMTA function may receive, through a PDSCH, first signaling sent by a base station, where the first signaling may be an SIB1. The first signaling includes a first TDD uplink-downlink configuration, and the first TDD uplink-downlink configuration is semi-statically configured.

The eIMTA user equipment may further receive, through an (e)PDCCH, second signaling sent by the base station. The second signaling includes a second TDD uplink-downlink configuration, and the second TDD uplink-downlink configuration may be dynamically changed, for example, the uplink-downlink configuration is changed every 10 ms to 40 ms.

Subframe types and configuration rules included in the first TDD uplink-downlink configuration and the second TDD uplink-downlink configuration still use the uplink-downlink configurations listed in Table 1.

Step S102: The eIMTA user equipment determines, according to the first TDD uplink-downlink configuration, an uplink subframe for sending a random access message 3.

The uplink subframe for sending the Msg3 is specified as follows: It is assumed that a random access response is received in a subframe n, and then the Msg3 is sent in a first uplink subframe n+k1, where k1>=6, and subframes are labeled as 0 to 9. When a value of an uplink delay field in a random access response grant is 0, the subframe n+k1 is a first available uplink subframe (available UL subframe). When the value of the uplink delay field in the random access response grant is 1, the Msg3 is sent in a first available uplink subframe after the subframe n+k1.

The non-eIMTA user equipment certainly sends the Msg3 according to the first TDD uplink-downlink configuration. However, the eIMTA function-enabled user equipment does not determine n+k1 according to the TDD uplink-downlink configuration notified on the (e)PDCCH, in other words, does not determine the subframe for sending the Msg3, according to the TDD uplink-downlink configuration notified on the (e)PDCCH, but determines n+k1 according to the TDD configuration notified in the SIB1, in other words, determines the subframe for sending the Msg3, according to the TDD configuration notified in the SIB1.

Step S103: The eIMTA function-enabled user equipment sends the random access message 3 to the base station in the determined uplink subframe.

The eIMTA function-enabled user equipment sends the Msg3 to the base station in the determined uplink subframe. According to the technical solution of this embodiment, because the base station knows that both the user equipment that does not enable an eIMTA function and the eIMTA function-enabled user equipment send Msg3s by uniformly using the uplink subframe that is determined according to the uplink-downlink configuration notified in the SIB1, the base station can accurately receive the Msg3s sent by the user equipment that does not enable an eIMTA function and the eIMTA function-enabled user equipment, thereby maintaining backward compatibility of a user equipment that does not enable an eIMTA function of a release prior to the release R12.

According to the random access method provided in this embodiment of the present invention, both a user equipment that does not enable an eIMTA function and an eIMTA function-enabled user equipment send random access messages 3 by uniformly using an uplink subframe that is determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment.

Figure 3:
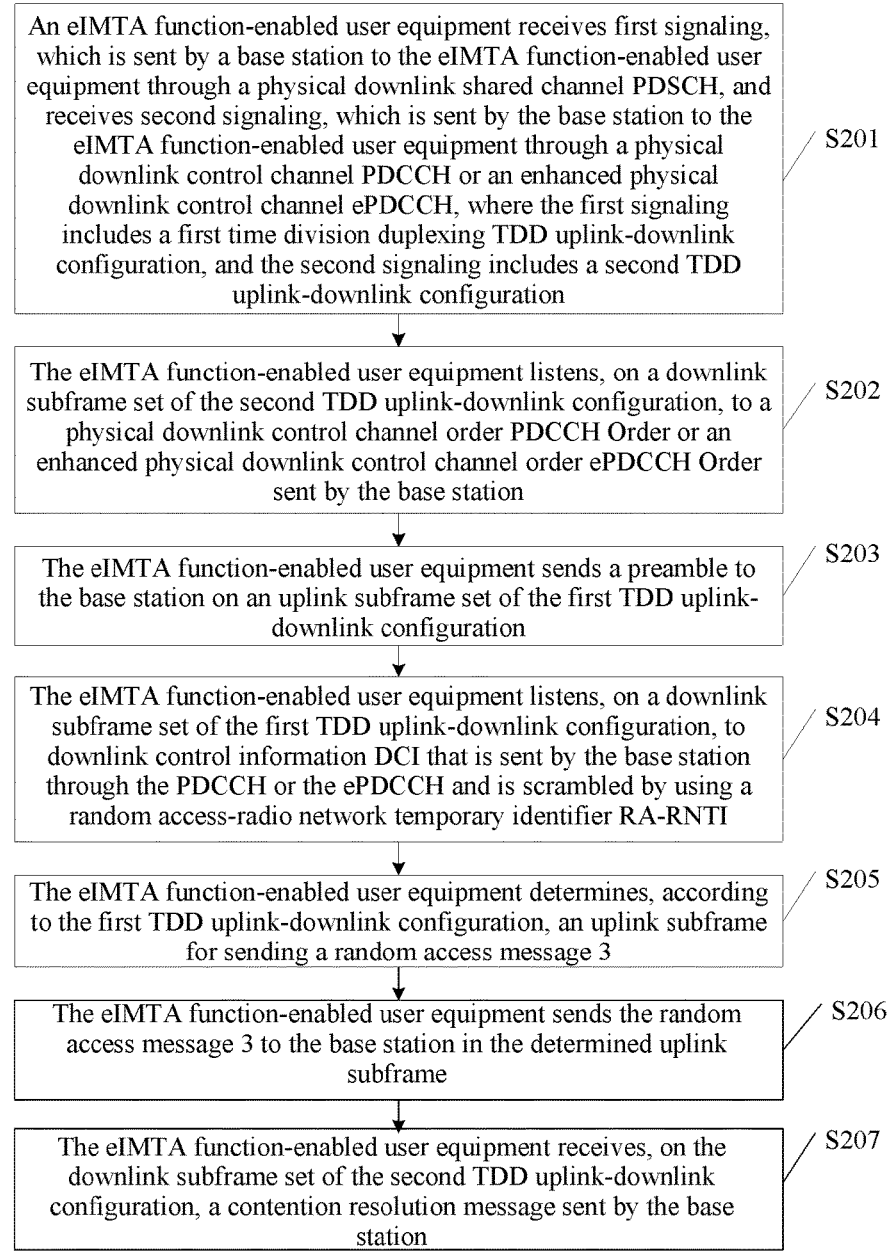
FIG. 3 is a flowchart of a second embodiment of a random access method according to the present invention.

FIG. 3 is a flowchart of a second embodiment of a random access method according to the present invention. As shown in FIG. 3, the method includes the following steps:

Step S201: An eIMTA function-enabled user equipment receives first signaling, which is sent by a base station to the eIMTA function-enabled user equipment through a physical downlink shared channel PDSCH, and receives second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

A specific implementation process of step S201 is the same as that of step S101 in the foregoing embodiment, and details are not described herein again.

Step S202: The eIMTA function-enabled user equipment listens, on a downlink subframe set of the second TDD uplink-downlink configuration, to a physical downlink control channel order PDCCH Order or an enhanced physical downlink control channel order ePDCCH Order sent by the base station.

The UE may listen to the (e)PDCCH Order according to the TDD uplink-downlink configuration that is notified in the signaling sent through the (e)PDCCH, and specifically, listen to the (e)PDCCH order in downlink subframes or a special subframe in the TDD configuration that is notified in the signaling sent through the (e)PDCCH. In this way, because available downlink subframes in the TDD configuration that is notified in the signaling sent through the (e)PDCCH are more than available downlink subframes in a TDD configuration notified in an SIB1, the UE may have more opportunities to receive the (e)PDCCH Order, thereby reducing a random access delay and improving scheduling flexibility of the base station. Alternatively, the UE may also listen, according to a TDD configuration that is notified in a message sent through the PDSCH, to the (e)PDCCH Order sent by the base station, where the message may be an SIB1.

In this embodiment of the present invention, the downlink subframe set may include a special subframe. When the UE listens to the (e)PDCCH Order in the special subframe in the TDD configuration that is notified in the signaling sent through the (e)PDCCH, if a corresponding subframe type indicated in the TDD configuration that is notified in the signaling sent through the (e)PDCCH is a downlink subframe, the UE may receive other downlink data according to the downlink subframe type. The situation is applicable to listening, in special subframe, to other messages sent by the base station, which is involved below.

Because the (e)PDCCH order is sent by the base station to a UE in a connection state to trigger the UE to perform random access, the base station typically knows whether the UE is an eIMTA function-enabled user equipment, and when the UE is the eIMTA function-enabled user equipment, the base station typically knows whether to use the TDD uplink-downlink configuration that is notified in the signaling sent through the (e)PDCCH.

Step S203: The eIMTA function-enabled user equipment sends a preamble to the base station on an uplink subframe set of the first TDD uplink-downlink configuration.

Because the base station does not know whether a UE sending the preamble is a user equipment that does not enable an eIMTA function or an eIMTA function-enabled user equipment, the preamble is sent by uniformly using an uplink subframe in the TDD uplink-downlink configuration notified in the SIB1, so as to ensure that the base station accurately receives the preamble sent by the user equipment.

When the base station sends the (e)PDCCH order to the UE, the (e)PDCCH order may carry a preamble index, and an existing protocol specifies that: if a user equipment receives an (e)PDCCH order in a subframe n, the preamble is sent on an available random access resource in a subframe n+k2, where k2>=6.

It is worth noting that, step S202, before step 203, is not necessarily executed, and the user equipment may trigger a random access process by itself.

It is worth noting that, when step S203 is executed, the sent preamble or used physical random access channel (PRACH) resource may be a preamble or a PRACH resource that can be used by the UE in the prior art. In this case, the base station cannot know whether the UE is an eIMTA UE only by means of the PRACH resource, or cannot distinguish whether the UE that executes a random access process in a contention mode is an eIMTA UE only by means of the preamble. Alternatively, when step S203 is executed, the sent preamble or the used PRACH resource may be a preamble or a PRACH resource that can be used by an eIMTA UE but cannot be used by other UEs, and in this case, the base station can distinguish whether the UE that executes the random access process in the contention mode is an eIMTA UE only by means of the PRACH resource or the preamble.

The preamble or PRACH resource that can be used by the eIMTA UE but cannot be used by other UEs may be a new preamble or PRACH resource, or a reserved part of preambles in an original preamble set. In a specific method, the preamble or PRACH resource may be configured for the eIMTA UE before step S203 by means of a system broadcast message, a dedicated RRC message or physical layer signaling, MAC layer signaling, and the like. An advantage of doing this is that the base station is enabled to recognize the eIMTA UE earlier, thereby reducing a random access delay and improving scheduling flexibility of the base station.

Step S204: The eIMTA function-enabled user equipment listens, on a downlink subframe set of the first TDD uplink-downlink configuration, to downlink control information DCI that is sent by the base station through the PDCCH or the ePDCCH and is scrambled by using a random access-radio network temporary identifier RA-RNTI.

Because the base station does not know whether the UE is an eIMTA UE after receiving the preamble, the DCI scrambled by using the RA-RNTI is listened to according to downlink subframes or a special subframe corresponding to the TDD configuration notified in the SIB1, thereby ensuring that all UEs can correctly receive the DCI.

It is understandable that, for a random access process in the non-contention mode or when the sent preamble or the used PRACH resource in step S203 is the preamble or PRACH resource that can be used by the eIMTA UE but cannot be used by other UEs, the base station can know whether the UE is an eIMTA UE after receiving the preamble, and when the UE is the eIMTA function-enabled user equipment, the base station can know whether to use the TDD uplink-downlink configuration that is notified in the signaling sent through the (e)PDCCH. Therefore, for the random access process in the non-contention mode or when the sent preamble or the used PRACH resource in step S204 is the preamble or PRACH resource that can be used by the eIMTA UE but cannot be used by other UEs, step S204 may also be replaced by listening, on the downlink subframe set of the second TDD uplink-downlink configuration, to downlink control information DCI that is sent by the base station through the (e)PDCCH and is scrambled by using a random access-radio network temporary identifier RA-RNTI. In this way, because available downlink subframes in the TDD uplink-downlink configuration that is notified in the signaling sent through the (e)PDCCH are more than available downlink subframes in the TDD configuration notified in the SIB1, the UE may have more opportunities to receive the DCI, thereby reducing a random access delay and improving scheduling flexibility of the base station. Certainly, for the random access process in the non-contention mode or when the sent preamble or the used PRACH resource in step S203 is the preamble or PRACH resource that can be used by the eIMTA UE but cannot be used by other UEs, the DCI may also be received in the manner of the original step S204.

It is also understandable that, step S205 to step S207 do not exist for a random access process in the non-contention mode.

Step S205: The eIMTA function-enabled user equipment determines, according to the first TDD uplink-downlink configuration, an uplink subframe for sending a random access message 3.

Step S206: The eIMTA function-enabled user equipment sends the random access message 3 to the base station in the determined uplink subframe.

Specific implementation processes of step S205 and step S206 are the same as those of step S102 and step S103 in the foregoing embodiment, and details are not described herein again.

Step S207: The eIMTA function-enabled user equipment receives, on the downlink subframe set of the second TDD uplink-downlink configuration, a contention resolution message sent by the base station.

Because the base station has already recognized whether the UE is an eIMTA function-enabled user equipment or a user equipment that does not enable an eIMTA function after receiving the random access message 3 sent by the UE, and when the UE is an eIMTA function-enabled user equipment, whether to use the TDD uplink-downlink configuration that is notified in the signaling sent through the (e)PDCCH, preferably, the UE listens to the contention resolution message according to the TDD uplink-downlink configuration that is notified in the signaling sent through the (e)PDCCH. In this way, because available downlink subframes in the TDD uplink-downlink configuration that is notified in the signaling sent through the (e)PDCCH are more than available downlink subframes in the TDD configuration notified in the SIB1, the UE may have more opportunities to receive the contention resolution message, thereby reducing a random access delay and improving scheduling flexibility of the base station.

Alternatively, the UE may also listen to the contention resolution message according to the TDD uplink-downlink configuration notified in the SIB1.

According to the random access method provided in this embodiment of the present invention, both a user equipment that does not enable an eIMTA function and an eIMTA function-enabled user equipment receive and send messages in a random access process by uniformly using an uplink subframe determined according to an uplink-downlink configuration that is included in signaling sent through a physical downlink shared channel, so that a base station can accurately receive random access messages sent by the user equipment that does not enable an eIMTA function and the eIMTA function-enabled user equipment, and problems of power overhead and uplink interference that are caused when the eIMTA function-enabled user equipment determines a transmission time of a random access message 3 according to a second TDD uplink-downlink configuration and sends the random access message 3 are reduced; and further, a random access delay can be reduced and scheduling flexibility of the base station can be improved.

Figure 4:
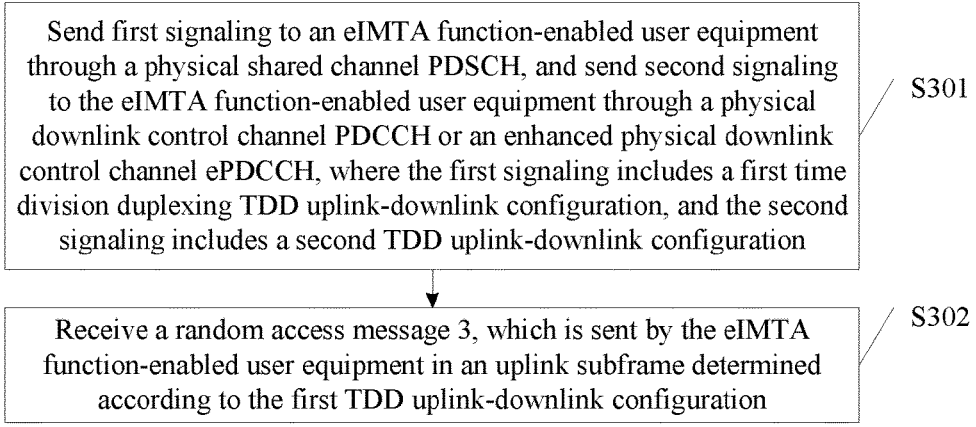
FIG. 4 is a flowchart of a third embodiment of a random access method according to the present invention.

FIG. 4 is a flowchart of a third embodiment of a random access method according to the present invention. As shown in FIG. 4, the method includes the following steps:

Step S301: Send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

Before correctly receiving a random access message 3, a base station does not know whether an eIMTA function-enabled user equipment or a user equipment that does not enable an eIMTA function sends messages before the random access message 3, but the base station may send first signaling to the eIMTA function-enabled user equipment and the user equipment that does not enable an eIMTA function through a PDSCH, where the first signaling may be an SIB1. The first signaling includes a first TDD uplink-downlink configuration, and the first TDD uplink-downlink configuration is semi-statically configured.

The eIMTA function-enabled user equipment may further receive, through an (e)PDCCH, second signaling sent by the base station. Therefore, the base station sends the second signaling to the eIMTA function-enabled user equipment through the (e)PDCCH. The second signaling includes a second TDD uplink-downlink configuration, and the second TDD uplink-downlink configuration may be dynamically changed, for example, the uplink-downlink configuration is changed every 10 ms to 40 ms.

Subframe types and configuration rules included in the first TDD uplink-downlink configuration and the second TDD uplink-downlink configuration still use the uplink-downlink configurations listed in Table 1.

Step S302: Receive a random access message 3, which is sent by the eIMTA function-enabled user equipment in an uplink subframe determined according to the first TDD uplink-downlink configuration.

The user equipment that does not enable an eIMTA function certainly sends the Msg3 according to the first TDD uplink-downlink configuration. However, an eIMTA function-enabled user equipment does not determine the subframe, which is for sending the Msg3, according to the TDD uplink-downlink configuration notified on the (e)PDCCH, but determines the subframe, which is for sending the Msg3, according to the TDD configuration notified in the SIB1. Therefore, for both the user equipment that does not enable an eIMTA function and the eIMTA function-enabled user equipment, the base station may always accurately receive, in the uplink subframe determined according to the first TDD uplink-downlink configuration, the Msg3s sent by the user equipment that does not enable an eIMTA function and the eIMTA function-enabled user equipment.

According to the technical solution of this embodiment, because the base station knows that both the user equipment that does not enable an eIMTA function and the eIMTA function-enabled user equipment send Msg3s by uniformly using the uplink subframe determined according to the uplink-downlink configuration notified in the SIB1, the base station can accurately receive the Msg3s sent by the user equipment that does not enable an eIMTA function and the eIMTA function-enabled user equipment, thereby maintaining backward compatibility of a user equipment that does not enable an eIMTA function of a release prior to the release R12.

According to the random access method provided in this embodiment of the present invention, both a user equipment that does not enable an eIMTA function and an eIMTA function-enabled user equipment send random access messages 3 by uniformly using an uplink subframe determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment.

Figure 5:
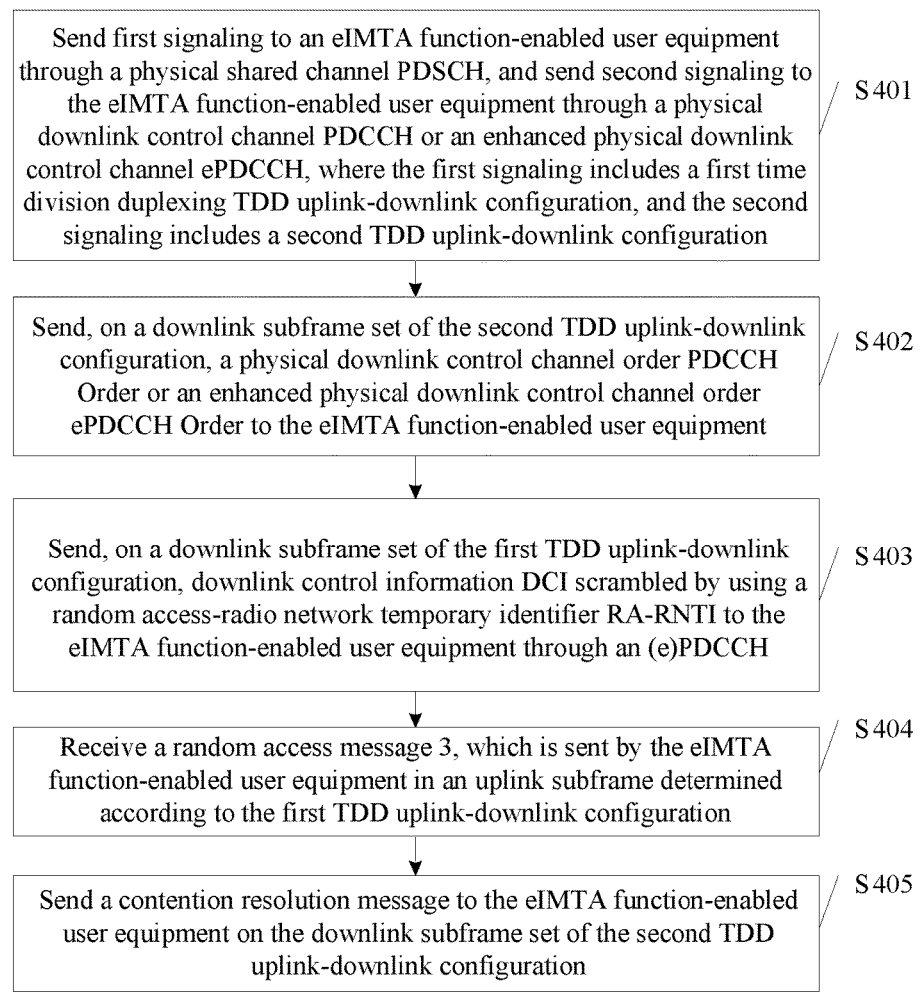
FIG. 5 is a flowchart of a fourth embodiment of a random access method according to the present invention.

FIG. 5 is a flowchart of a fourth embodiment of a random access method according to the present invention. As shown in FIG. 5, the method includes the following steps:

Step S401: Send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

A specific implementation process of step S401 is the same as that of step S301 in the foregoing embodiment, and details are not described herein again.

Step S402: Send, on a downlink subframe set of the second TDD uplink-downlink configuration, a physical downlink control channel order PDCCH Order or an enhanced physical downlink control channel order ePDCCH Order to the eIMTA function-enabled user equipment.

A base station sends the (e)PDCCH Order to the eIMTA function-enabled user equipment on the downlink subframe set of the second TDD uplink-downlink configuration. In this way, because available downlink subframes in the TDD configuration that is notified in the signaling sent through the (e)PDCCH are more than available downlink subframes in a TDD configuration notified in an SIB1, the UE may have more opportunities to receive the (e)PDCCH Order, thereby reducing a random access delay and improving scheduling flexibility of the base station. Alternatively, the base station may also send the (e)PDCCH Order to the eIMTA function-enabled user equipment on a downlink subframe set of the first TDD uplink-downlink configuration.

In this embodiment of the present invention, the downlink subframe set may include a special subframe. When the base station sends the (e)PDCCH Order to the eIMTA function-enabled user equipment on the downlink subframe set of the second TDD uplink-downlink configuration, if a corresponding subframe type that may be indicated in the TDD uplink-downlink configuration is a downlink subframe, the UE may receive other downlink data according to the downlink subframe type. The situation is applicable to listening, in a special subframe, to other messages sent by the base station, which is involved below.

Step S403: Send, on a downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

The base station still does not know whether the UE is an eIMTA UE after receiving a preamble sent by the UE, and therefore the DCI scrambled by using the RA-RNTI is sent to the UE in downlink subframes or a special subframe corresponding to the TDD configuration notified in the SIB1, thereby ensuring that all UEs can correctly receive the DCI.

Step S404: Receive a random access message 3, which is sent by the eIMTA function-enabled user equipment in an uplink subframe determined according to the first TDD uplink-downlink configuration.

A specific implementation process of step S404 is the same as that of step S302 in the foregoing embodiment, and details are not described herein again.

Step S405: Send a contention resolution message to the eIMTA function-enabled user equipment on the downlink subframe set of the second TDD uplink-downlink configuration.

Because the base station has already recognized whether the UE is an eIMTA function-enabled user equipment or a user equipment that does not enable an eIMTA function after receiving the random access message 3 sent by the UE, and when the UE is an eIMTA function-enabled user equipment, whether to use the TDD uplink-downlink configuration that is notified in the signaling sent through the (e)PDCCH, preferably, the base station sends the contention resolution message to the eIMTA function-enabled user equipment on the downlink subframe set of the second TDD uplink-downlink configuration. In this way, because available downlink subframes in the TDD uplink-downlink configuration that is notified in the signaling sent through the (e)PDCCH are more than available downlink subframes in the TDD configuration notified in the SIB1, the UE may have more opportunities to receive the contention resolution message, thereby reducing a random access delay and improving scheduling flexibility of the base station.

Alternatively, the base station may also send the contention resolution message to the eIMTA function-enabled user equipment on the downlink subframe set of the first TDD uplink-downlink configuration.

According to the random access method provided in this embodiment of the present invention, both a user equipment that does not enable an eIMTA function and an eIMTA function-enabled user equipment receive and send messages in a random access process by uniformly using an uplink subframe determined according to an uplink-downlink configuration that is included in signaling sent through a physical downlink shared channel, so that a base station can accurately receive random access messages sent by the user equipment that does not enable an eIMTA function and the eIMTA function-enabled user equipment; and further, a random access delay can be reduced and scheduling flexibility of the base station can be improved.

Figure 6:
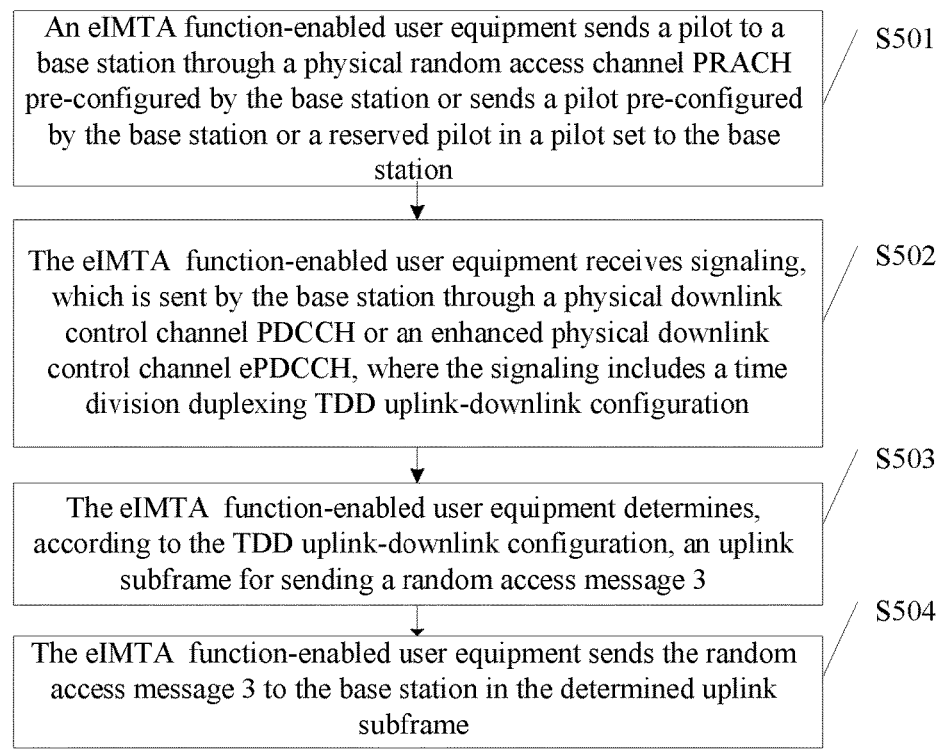
FIG. 6 is a flowchart of a fifth embodiment of a random access method according to the present invention.

FIG. 6 is a flowchart of a fifth embodiment of a random access method according to the present invention. As shown in FIG. 6, the method includes the following steps:

Step S501: An eIMTA function-enabled user equipment sends a pilot to a base station through a physical random access channel PRACH pre-configured by the base station or sends a pilot pre-configured by the base station or a reserved pilot in a pilot set to the base station.

Step S502: The eIMTA function-enabled user equipment receives signaling, which is sent by the base station through a physical downlink control channel PDCCH or an enhanced physical downlink control channel ePDCCH, where the signaling includes a time division duplexing TDD uplink-downlink configuration.

Step S503: The eIMTA function-enabled user equipment determines, according to the TDD uplink-downlink configuration, an uplink subframe for sending a random access message 3.

Step S504: The eIMTA function-enabled user equipment sends the random access message 3 to the base station in the determined uplink subframe.

For the eIMTA UE, the base station configures a new PRACH resource or a new preamble, or reserves a part of preambles in an original preamble set.

In this way, when the eIMTA UE uses the new PRACH resource, or the new preamble, or the reserved part of preambles in the original preamble set to perform a random access process, the base station determines that the UE is an eIMTA UE according to the PRACH resource, or the new preamble, or the reserved part of preambles in the original preamble set. Therefore, the random access message 3 may be received according to a TDD configuration notified in (e)PDCCH signaling. Because the TDD configuration notified in the (e)PDCCH signaling represents a configuration that is most suitable for system performance, performance of the random access process can be improved when the TDD configuration notified in the (e)PDCCH signaling is used to execute the random access process. However, a non-eIMTA UE receives the random access message 3 according to a TDD uplink-downlink configuration notified in an SIB1, so that the base station accurately receives the random access messages 3 sent by the eIMTA function-enabled user equipment and the user equipment that does not enable an eIMTA function.

It is understandable that, the new PRACH resource, or the new preamble, or the reserved part of preambles in the original preamble set may be configured for the UE by means of a system broadcast message, a dedicated RRC message or physical layer signaling, MAC layer signaling, and the like.

According to the random access method provided in this embodiment of the present invention, a preamble is sent to a base station according to a new PRACH resource preconfigured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function.

Figure 7:
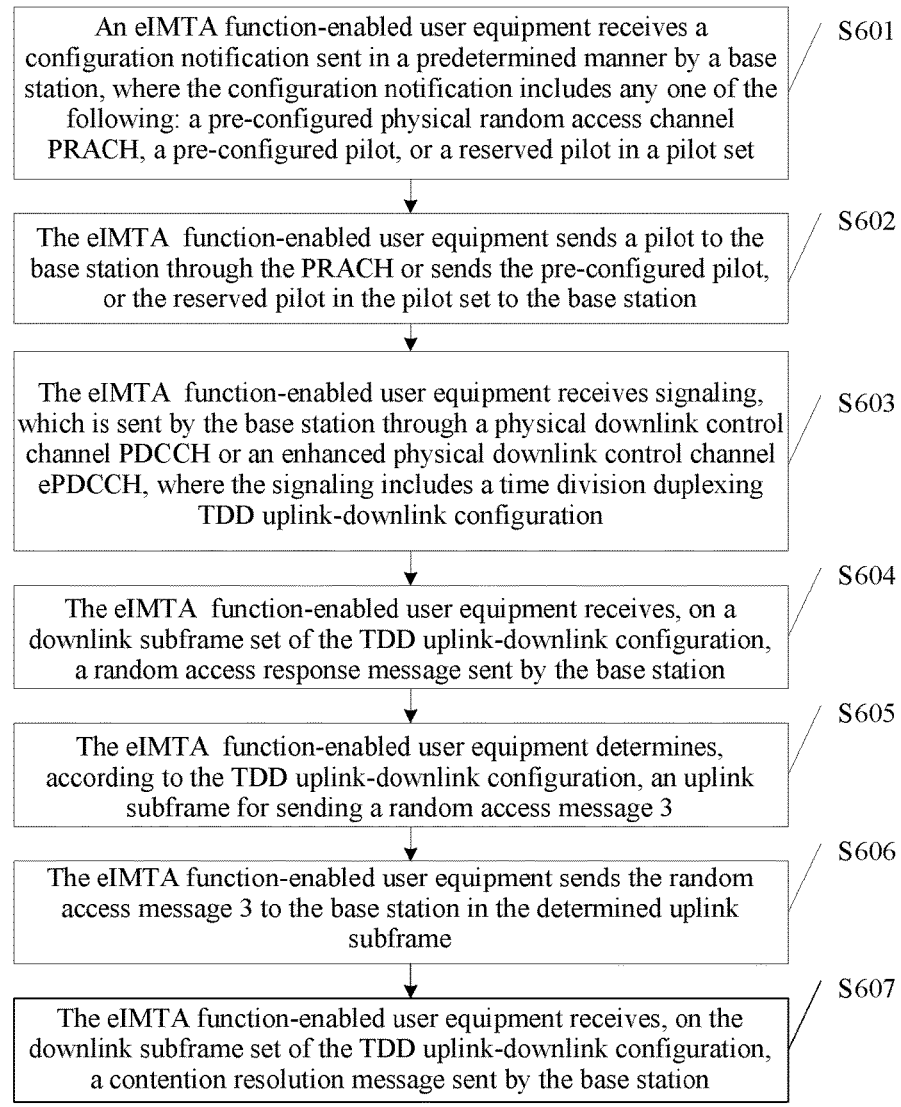
FIG. 7 is a flowchart of a sixth embodiment of a random access method according to the present invention.

FIG. 7 is a flowchart of a sixth embodiment of a random access method according to the present invention. As shown in FIG. 7, the method includes the following steps:

Step S601: An eIMTA function-enabled user equipment receives a configuration notification sent by a base station in a predetermined manner, where the configuration notification includes any one of the following: a pre-configured physical random access channel PRACH, a pre-configured pilot, or a reserved pilot in a pilot set.

Step S602: The eIMTA function-enabled user equipment sends a pilot to the base station through the PRACH, or sends the pre-configured pilot or the reserved pilot in the pilot set to the base station.

Step S603: The eIMTA function-enabled user equipment receives signaling, which is sent by the base station through a physical downlink control channel PDCCH or an enhanced physical downlink control channel ePDCCH, where the signaling includes a time division duplexing TDD uplink-downlink configuration.

Step S604: The eIMTA function-enabled user equipment receives, on a downlink subframe set of the TDD uplink-downlink configuration, a random access response message sent by the base station.

Step S605: The eIMTA function-enabled user equipment determines, according to the TDD uplink-downlink configuration, an uplink subframe for sending a random access message 3.

Step S606: The eIMTA function-enabled user equipment sends the random access message 3 to the base station in the determined uplink subframe.

Step S607: The eIMTA function-enabled user equipment receives, on the downlink subframe set of the TDD uplink-downlink configuration, a contention resolution message sent by the base station.

A difference between this embodiment and the foregoing embodiment lies in that, the base station determines that the UE is an eIMTA UE according to the new PRACH resource, or the new preamble, or the reserved part of preambles in the original preamble set. Therefore, a subsequent random access response message, the random access message 3, and the contention resolution message may all be sent or received according to a TDD configuration notified in (e)PDCCH signaling.

According to the random access method provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function; and further, a random access delay can be reduced and scheduling flexibility of the base station can be improved.

Figure 8:
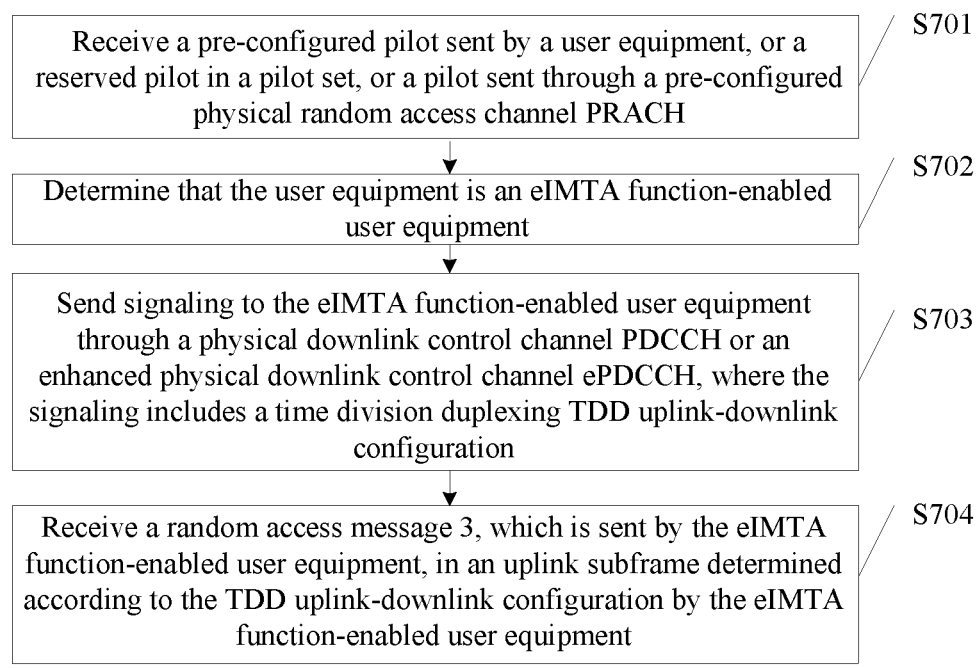
FIG. 8 is a flowchart of a seventh embodiment of a random access method according to the present invention.

FIG. 8 is a flowchart of a seventh embodiment of a random access method according to the present invention. As shown in FIG. 8, the method includes the following steps:

Step S701: Receive a pre-configured pilot sent by a user equipment, or a reserved pilot in a pilot set, or a pilot sent through a pre-configured physical random access channel PRACH.

Step S702: Determine that the user equipment is an eIMTA function-enabled user equipment.

Step S703: Send signaling to the eIMTA function-enabled user equipment through a physical downlink control channel PDCCH or an enhanced physical downlink control channel ePDCCH, where the signaling includes a time division duplexing TDD uplink-downlink configuration.

Step S704: Receive a random access message 3 in an uplink subframe determined according to the TDD uplink-downlink configuration by the eIMTA function-enabled user equipment, where the random access message 3 is sent by the eIMTA function-enabled user equipment.

For the eIMTA UE, the base station configures a new PRACH resource or a new preamble, or reserves a part of preambles in an original preamble set.

In this way, when the eIMTA UE uses the new PRACH resource, or the new preamble, or the reserved part of preambles in the original preamble set to perform a random access process, the base station notifies the PRACH resource, or the new preamble, or reserves the part of preambles in the original preamble set, to determine that the UE is an eIMTA UE. Therefore, the random access message 3 may be received according to a TDD configuration notified in (e)PDCCH signaling. Because the TDD configuration notified in the (e)PDCCH signaling represents a configuration that is most suitable for system performance, performance of the random access process can be improved when the TDD configuration notified in the (e)PDCCH signaling is used to execute the random access process. However, a non-eIMTA UE receives the random access message 3 according to a TDD uplink-downlink configuration notified in an SIB1, so that the base station accurately receives the random access messages 3 sent by the eIMTA function-enabled user equipment and the user equipment that does not enable an eIMTA function.

It is understandable that, the new PRACH resource, or the new preamble, or the reserved part of preambles in the original preamble set may be configured for the UE by means of a system broadcast message, a dedicated RRC message or physical layer signaling, MAC layer signaling, and the like.

According to the random access method provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function.

Figure 9:
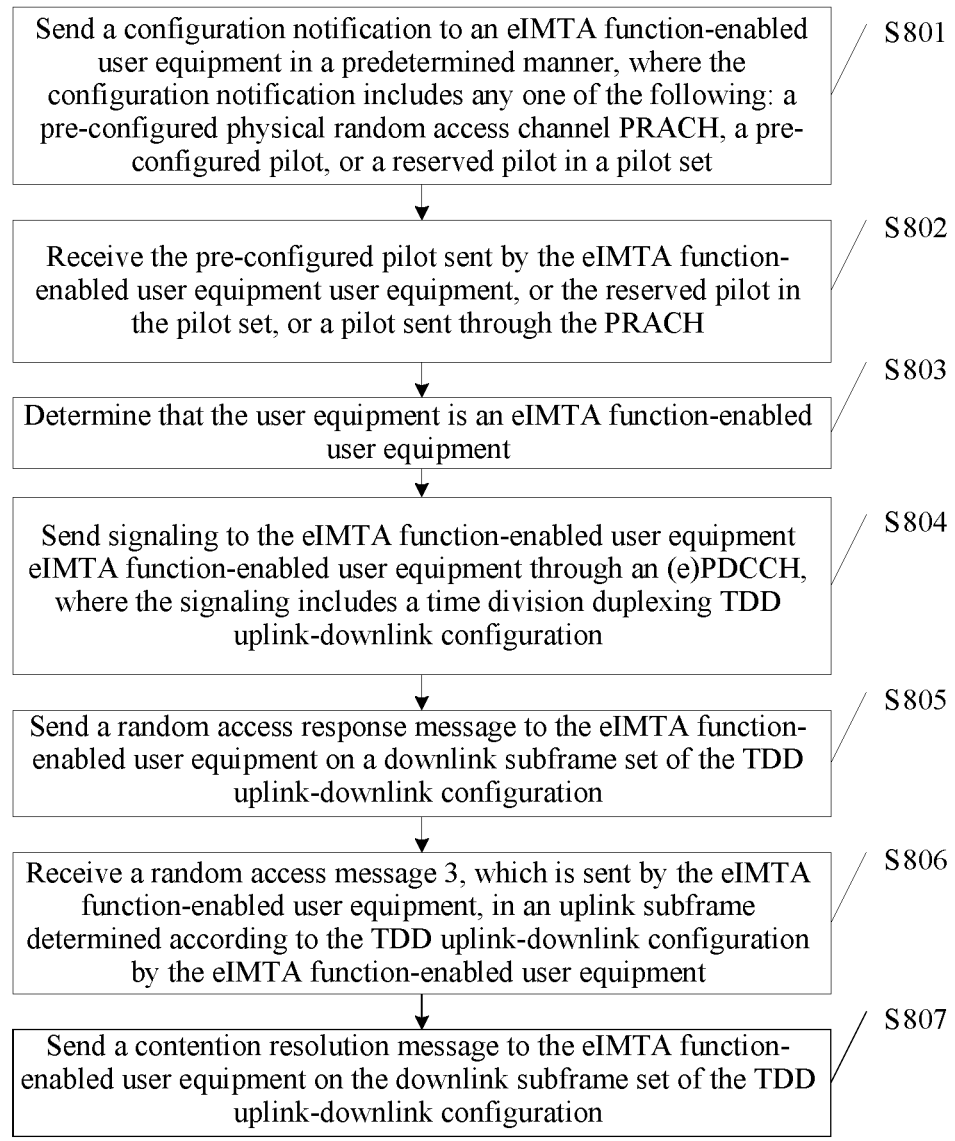
FIG. 9 is a flowchart of an eighth embodiment of a random access method according to the present invention.

FIG. 9 is a flowchart of an eighth embodiment of a random access method according to the present invention. As shown in FIG. 9, the method includes the following steps:

Step S801: Send a configuration notification to an eIMTA function-enabled user equipment in a predetermined manner, where the configuration notification includes any one of the following: a pre-configured physical random access channel PRACH, a pre-configured pilot, or a reserved pilot in a pilot set.

Step S802: Receive the pre-configured pilot sent by the eIMTA function-enabled user equipment, or the reserved pilot in the pilot set, or a pilot sent through the PRACH.

Step S803: Determine that the user equipment is an eIMTA function-enabled user equipment.

Step S804: Send signaling to the eIMTA function-enabled user equipment through a physical downlink control channel PDCCH or an enhanced physical downlink control channel ePDCCH, where the signaling includes a time division duplexing TDD uplink-downlink configuration.

Step S805: Send a random access response message to the eIMTA function-enabled user equipment on a downlink subframe set of the TDD uplink-downlink configuration.

Step S806: Receive a random access message 3 in an uplink subframe determined according to the TDD uplink-downlink configuration by the eIMTA function-enabled user equipment, where the random access message 3 is sent by the eIMTA function-enabled user equipment.

Step S807: Send a contention resolution message to the eIMTA function-enabled user equipment on the downlink subframe set of the TDD uplink-downlink configuration.

A difference between this embodiment and the foregoing embodiment lies in that, the base station determines that the UE is an eIMTA UE according to the new PRACH resource, or the new preamble, or the reserved part of preambles in the original preamble set. Therefore, a subsequent random access response message, the random access message 3, and the contention resolution message may all be sent or received according to a TDD configuration notified in (e)PDCCH signaling.

According to the random access method provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function; and further, a random access delay can be reduced and scheduling flexibility of the base station can be improved.

Figure 10:
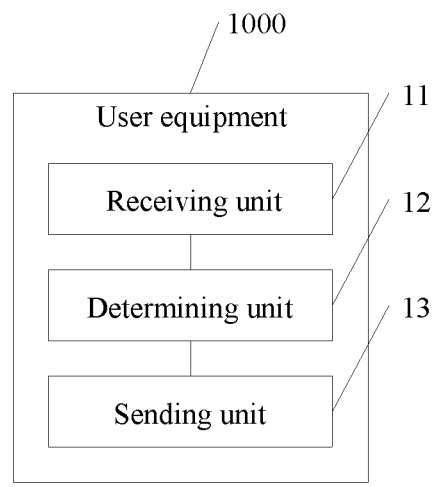
FIG. 10 is a schematic structural diagram of a first embodiment of a user equipment according to the present invention.

FIG. 10 is a schematic structural diagram of a first embodiment of a user equipment according to the present invention. As shown in FIG. 10, the user equipment 1000 includes a receiving unit 11, a determining unit 12, and a sending unit 13.

The receiving unit 11 is configured to receive first signaling, which is sent by a base station to an eIMTA function-enabled user equipment through a physical downlink shared channel PDSCH, and receive second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

Both an eIMTA function-enabled user equipment and a user equipment that does not enable an eIMTA function may receive, through a PDSCH, first signaling sent by a base station, where the first signaling may be an SIB1. The first signaling includes a first TDD uplink-downlink configuration, and the first TDD uplink-downlink configuration is semi-statically configured.

For the eIMTA function-enabled user equipment, a receiving unit 11 may further receive, through an (e)PDCCH, second signaling sent by the base station. The second signaling includes a second TDD uplink-downlink configuration, and the second TDD uplink-downlink configuration may be dynamically changed, for example, the uplink-downlink configuration is changed every 10 ms to 40 ms.

Subframe types and configuration rules included in the first TDD uplink-downlink configuration and the second TDD uplink-downlink configuration still use the uplink-downlink configurations listed in Table 1.

The determining unit 12 is configured to determine, according to the first TDD uplink-downlink configuration, an uplink subframe for sending a random access message 3.

The uplink subframe for sending the Msg3 is specified as follows: It is assumed that a random access response is received in a subframe n, and then the Msg3 is sent in a first uplink subframe n+k1, where k1>=6, and subframes are labeled as 0 to 9. When a value of an uplink delay field in a random access response grant is 0, the subframe n+k1 is a first available uplink subframe (available UL subframe). When the value of the uplink delay field in the random access response grant is 1, the Msg3 is sent in a first available uplink subframe after the subframe n+k1.

The user equipment that does not enable an eIMTA function certainly sends the Msg3 according to the first TDD uplink-downlink configuration. However, the determining unit 12 of the eIMTA function-enabled user equipment does not determine n+k1 according to the TDD uplink-downlink configuration notified on the (e)PDCCH, in other words, does not determine the subframe for sending the Msg3, according to the TDD uplink-downlink configuration notified on the (e)PDCCH, but determines n+k1 according to the TDD configuration notified in the SIB1, in other words, determines the subframe for sending the Msg3, according to the TDD configuration notified in the SIB1.

The sending unit 13 is configured to send the random access message 3 to the base station in the determined uplink subframe.

The sending unit 13 of the eIMTA function-enabled user equipment sends the Msg3 to the base station in the determined uplink subframe. According to the technical solution of this embodiment, because the base station knows that both the user equipment that does not enable an eIMTA function and the eIMTA function-enabled user equipment send Msg3s by uniformly using the uplink subframe determined according to the uplink-downlink configuration notified in the SIB1, the base station can accurately receive the Msg3s sent by the user equipment that does not enable an eIMTA function and the eIMTA function-enabled user equipment, thereby maintaining backward compatibility of a user equipment that does not enable an eIMTA function of a release prior to the release R12.

According to the user equipment provided in this embodiment of the present invention, both a user equipment that does not enable an eIMTA function and an eIMTA function-enabled user equipment send random access messages 3 by uniformly using an uplink subframe determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment.

Figure 11:
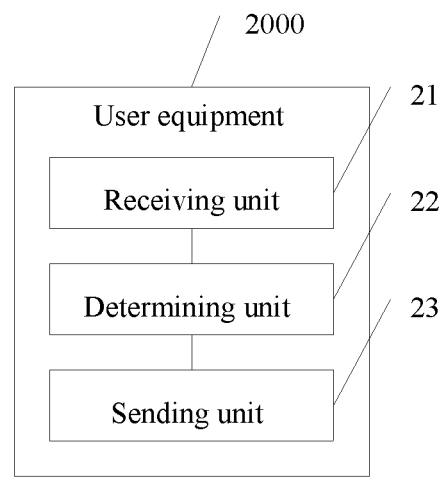
FIG. 11 is a schematic structural diagram of a second embodiment of a user equipment according to the present invention.

FIG. 11 is a schematic structural diagram of a second embodiment of a user equipment according to the present invention. As shown in FIG. 11, the user equipment 2000 includes a receiving unit 21, a sending unit 23, and a determining unit 22.

The receiving unit 21 is configured to receive first signaling, which is sent by a base station to an eIMTA function-enabled user equipment through a physical downlink shared channel PDSCH, and receive second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

The receiving unit 21 is further configured to listen, on a downlink subframe set of the second TDD uplink-downlink configuration, to a physical downlink control channel order PDCCH Order or an enhanced physical downlink control channel order ePDCCH Order sent by the base station.

The receiving unit 21 may listen to the (e)PDCCH Order according to the TDD uplink-downlink configuration notified in the signaling sent through the (e)PDCCH, and specifically, listen to the (e)PDCCH order in downlink subframes or a special subframe in the TDD configuration notified in the signaling sent through the (e)PDCCH. In this way, because available downlink subframes in the TDD configuration notified in the signaling sent through the (e)PDCCH are more than available downlink subframes in a TDD configuration notified in an SIB1, the UE may have more opportunities to receive the (e)PDCCH Order, thereby reducing a random access delay and improving scheduling flexibility of the base station. Alternatively, the UE may also listen, according to a TDD configuration notified in a message sent through the PDSCH, to the (e)PDCCH Order sent by the base station, where the message may be an SIB1.

In this embodiment of the present invention, the downlink subframe set may include a special subframe. When the UE listens to the (e)PDCCH Order in the special subframe in the TDD configuration that is notified in the signaling sent through the (e)PDCCH, if a corresponding subframe type indicated in the TDD configuration that is notified in the signaling sent through the (e)PDCCH is a downlink subframe, the UE may receive other downlink data according to the downlink subframe type. The situation is applicable to listening, in a special subframe, to other messages sent by the base station, which is involved below.

Because the (e)PDCCH order is sent by the base station to a UE in a connection state to trigger the UE to perform random access, the base station typically knows whether the UE is an eIMTA function-enabled user equipment, and when the UE is the eIMTA function-enabled user equipment, the base station typically knows whether to use the TDD uplink-downlink configuration that is notified in the signaling sent through the (e)PDCCH.

The sending unit 23 is configured to send a preamble to the base station on an uplink subframe set of the first TDD uplink-downlink configuration.

Because the base station does not know whether a UE sending the preamble is a user equipment that does not enable an eIMTA function or an eIMTA function-enabled user equipment, the sending unit 23 of the eIMTA function-enabled user equipment sends the preamble by using an uplink subframe in the TDD uplink-downlink configuration notified in the SIB1, so as to ensure that the base station accurately receives the preamble sent by the user equipment.

When the base station sends the (e)PDCCH order to the UE, the (e)PDCCH order may carry a preamble index, and an existing protocol specifies that: if a user receives an (e)PDCCH order in a subframe n, the preamble is sent on an available random access resource in a subframe n+k2, where k2>=6.

It is worth noting that, the base station may send the (e)PDCCH order to the user equipment to trigger a random access process of the user equipment, and the user equipment may also trigger a random access process by itself.

The receiving unit 21 is further configured to listen, on a downlink subframe set of the first TDD uplink-downlink configuration, to downlink control information DCI that is sent by the base station through the PDCCH or the ePDCCH and is scrambled by using a random access-radio network temporary identifier RA-RNTI.

Because the base station does not know whether the UE is an eIMTA UE after receiving the preamble, the receiving unit 21 listens to the DCI, which is scrambled by using the RA-RNTI, according to downlink subframes or a special subframe corresponding to the TDD configuration notified in the SIB1, thereby ensuring that all UEs can correctly receive the DCI.

The determining unit 22 is configured to determine, according to the first TDD uplink-downlink configuration, an uplink subframe for sending a random access message 3.

The sending unit 23 is further configured to send the random access message 3 to the base station in the determined uplink subframe.

The receiving unit 21 is further configured to receive, on the downlink subframe set of the second TDD uplink-downlink configuration, a contention resolution message sent by the base station.

Because the base station has already recognized whether the UE is an eIMTA function-enabled user equipment or a user equipment that does not enable an eIMTA function after receiving the random access message 3 sent by the UE, and when the UE is an eIMTA function-enabled user equipment, whether to use the TDD uplink-downlink configuration that is notified in the signaling sent through the (e)PDCCH, preferably, the receiving unit 21 listens to the contention resolution message according to the TDD uplink-downlink configuration that is notified in the signaling sent through the (e)PDCCH. In this way, because available downlink subframes in the TDD uplink-downlink configuration that is notified in the signaling sent through the (e)PDCCH are more than available downlink subframes in the TDD configuration notified in the SIB1, the UE may have more opportunities to receive the contention resolution message, thereby reducing a random access delay and improving scheduling flexibility of the base station.

Alternatively, the UE may also listen to the contention resolution message according to the TDD uplink-downlink configuration notified in the SIB1.

According to the user equipment provided in this embodiment of the present invention, both a user equipment that does not enable an eIMTA function and an eIMTA function-enabled user equipment receive and send messages in a random access process by uniformly using an uplink subframe determined according to an uplink-downlink configuration that is included in signaling sent through a physical downlink shared channel, so that a base station can accurately receive random access messages sent by the user equipment that does not enable an eIMTA function and the eIMTA function-enabled user equipment, and problems of power overhead and uplink interference that are caused when the eIMTA function-enabled user equipment determines a transmission time of a random access message 3 according to a second TDD uplink-downlink configuration and sends the random access message 3 are reduced; and further, a random access delay can be reduced and scheduling flexibility of the base station can be improved.

Figure 12:
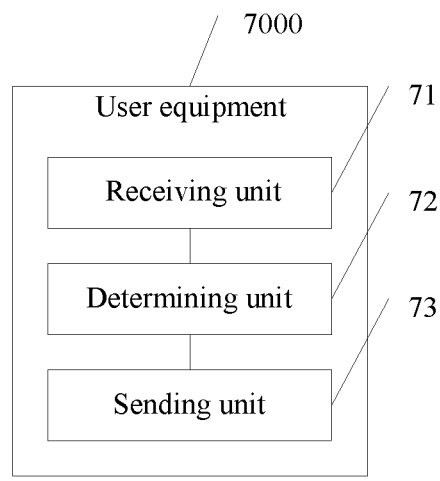
FIG. 12 is a schematic structural diagram of a third embodiment of a user equipment according to the present invention.

FIG. 12 is a schematic structural diagram of a third embodiment of a user equipment according to the present invention. As shown in FIG. 12, the user equipment 7000 includes a sending unit 73, a receiving unit 71, and a determining unit 72.

The sending unit 73 is configured to send a pilot to a base station through a physical random access channel PRACH pre-configured by the base station or send a pilot pre-configured by the base station or a reserved pilot in a pilot set to the base station.

The receiving unit 71 is configured to receive signaling, which is sent by the base station through a physical downlink control channel PDCCH or an enhanced physical downlink control channel ePDCCH, where the signaling includes a time division duplexing TDD uplink-downlink configuration.

The determining unit 72 is configured to determine, according to the TDD uplink-downlink configuration, an uplink subframe for sending a random access message 3.

The sending unit 73 is further configured to send the random access message 3 to the base station in the determined uplink subframe.

For the eIMTA UE, the base station configures a new PRACH resource or a new preamble, or reserves a part of preambles in an original preamble set.

In this way, when the eIMTA UE uses the new PRACH resource, or the new preamble, or the reserved part of preambles in the original preamble set to perform a random access process, the base station notifies the PRACH resource, or the new preamble, or reserves the part of preambles in the original preamble set, to determine that the UE is an eIMTA UE. Therefore, the random access message 3 may be received according to a TDD configuration notified in (e)PDCCH signaling. Because the TDD configuration notified in the (e)PDCCH signaling represents a configuration that is most suitable for system performance, performance of the random access process can be improved when the TDD configuration notified in the (e)PDCCH signaling is used to execute the random access process. However, a non-eIMTA UE receives the random access message 3 according to a TDD uplink-downlink configuration notified in an SIB1, so that the base station accurately receives the random access messages 3 sent by the eIMTA function-enabled user equipment and the user equipment that does not enable an eIMTA function.

It is understandable that, the new PRACH resource, or the new preamble, or the reserved part of preambles in the original preamble set may be configured for the UE by means of a system broadcast message, a dedicated RRC message or physical layer signaling, MAC layer signaling, and the like.

According to the user equipment provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function.

Figure 13:
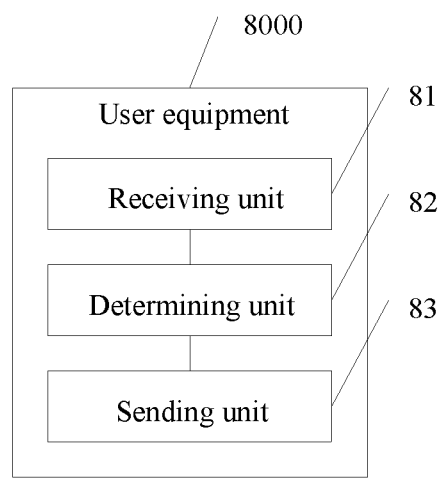
FIG. 13 is a schematic structural diagram of a fourth embodiment of a user equipment according to the present invention.

FIG. 13 is a schematic structural diagram of a fourth embodiment of a user equipment according to the present invention. As shown in FIG. 13, the user equipment 8000 includes a receiving unit 81, a sending unit 83, and a determining unit 82.

The receiving unit 81 is configured to receive a configuration notification sent in a predetermined manner by a base station, where the configuration notification includes any one of the following: a pre-configured physical random access channel PRACH, a pre-configured pilot, or a reserved pilot in a pilot set.

The sending unit 83 is configured to send a pilot to the base station through the PRACH, or send the pre-configured pilot, or the reserved pilot in the pilot set to the base station.

The receiving unit 81 is further configured to receive signaling, which is sent by the base station through a physical downlink control channel PDCCH or an enhanced physical downlink control channel ePDCCH, where the signaling includes a time division duplexing TDD uplink-downlink configuration.

The receiving unit 81 is further configured to receive, on a downlink subframe set of the TDD uplink-downlink configuration, a random access response message sent by the base station.

The determining unit 82 is configured to determine, according to the TDD uplink-downlink configuration, an uplink subframe for sending a random access message 3.

The sending unit 83 is further configured to send the random access message 3 to the base station in the determined uplink subframe.

The receiving unit 81 is further configured to receive, on the downlink subframe set of the TDD uplink-downlink configuration, a contention resolution message sent by the base station.

A difference between this embodiment and the foregoing embodiment lies in that, the base station determines that the UE is an eIMTA UE according to the new PRACH resource, or the new preamble, or the reserved part of preambles in the original preamble set. Therefore, a subsequent random access response message, the random access message 3, and the contention resolution message may all be sent or received according to a TDD configuration notified in (e)PDCCH signaling.

According to the user equipment provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function; and further, a random access delay can be reduced and scheduling flexibility of the base station can be improved.

Figure 14:
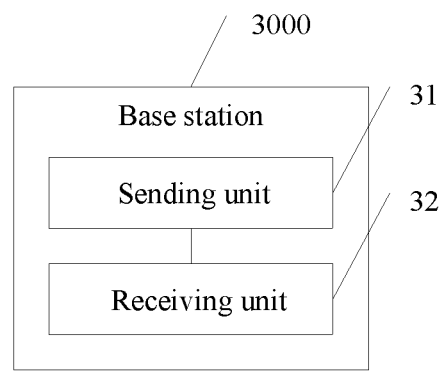
FIG. 14 is a schematic structural diagram of a first embodiment of a base station according to the present invention.

FIG. 14 is a schematic structural diagram of a first embodiment of a base station according to the present invention. As shown in FIG. 14, the base station 3000 includes a sending unit 31 and a receiving unit 32.

The sending unit 31 is configured to send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

Before correctly receiving a random access message 3, the base station does not know whether a UE sending messages before the random access message 3 is an eIMTA function-enabled user equipment or a user equipment that does not enable an eIMTA function, but the sending unit 31 may send first signaling to the eIMTA function-enabled user equipment and the user equipment that does not enable an eIMTA function through a PDSCH, where the first signaling may be an SIB1. The first signaling includes a first TDD uplink-downlink configuration, and the first TDD uplink-downlink configuration is semi-statically configured.

The eIMTA function-enabled user equipment may further receive, through an (e)PDCCH, second signaling sent by the base station. Therefore, the sending unit 31 sends the second signaling to the eIMTA function-enabled user equipment through the (e)PDCCH. The second signaling includes a second TDD uplink-downlink configuration, and the second TDD uplink-downlink configuration may be dynamically changed, for example, the uplink-downlink configuration is changed every 10 ms to 40 ms.

Subframe types and configuration rules included in the first TDD uplink-downlink configuration and the second TDD uplink-downlink configuration still use the uplink-downlink configurations listed in Table 1.

The receiving unit 32 is configured to receive a random access message 3, which is sent by the eIMTA function-enabled user equipment in an uplink subframe determined according to the first TDD uplink-downlink configuration.

The user equipment that does not enable an eIMTA function certainly sends the Msg3 according to the first TDD uplink-downlink configuration. However, the eIMTA function-enabled user equipment does not determine the subframe, which is for sending the Msg3, according to the TDD uplink-downlink configuration notified on the (e)PDCCH, but determines the subframe, which is for sending the Msg3, according to the TDD configuration notified in the SIB1. Therefore, for both the user equipment that does not enable an eIMTA function and the eIMTA function-enabled user equipment, the receiving unit 32 may always accurately receive, in the uplink subframe determined according to the first TDD uplink-downlink configuration, the Msg3s sent by the user equipment that does not enable an eIMTA function and the eIMTA function-enabled user equipment.

According to the technical solution of this embodiment, because the base station knows that both the user equipment that does not enable an eIMTA function and the eIMTA function-enabled user equipment send Msg3s by uniformly using the uplink subframe determined according to the uplink-downlink configuration notified in the SIB1, the base station can accurately receive the Msg3s sent by the user equipment that does not enable an eIMTA function and the eIMTA function-enabled user equipment, thereby maintaining backward compatibility of a user equipment that does not enable an eIMTA function of a release prior to the release R12.

According to the base station provided in this embodiment of the present invention, both a user equipment that does not enable an eIMTA function and an eIMTA function-enabled user equipment send random access messages 3 by uniformly using an uplink subframe determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment.

Figure 15:
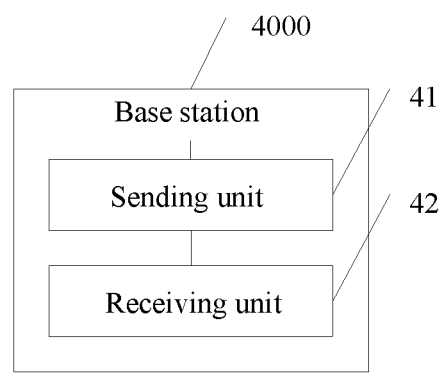
FIG. 15 is a schematic structural diagram of a second embodiment of a base station according to the present invention.

FIG. 15 is a schematic structural diagram of a second embodiment of a base station according to the present invention. As shown in FIG. 15, the base station 4000 includes a sending unit 41 and a receiving unit 42.

The sending unit 41 is configured to send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration.

The sending unit 41 is further configured to send, on a downlink subframe set of the second TDD uplink-downlink configuration, a physical downlink control channel order PDCCH Order or an enhanced physical downlink control channel order ePDCCH Order to the eIMTA function-enabled user equipment.

The sending unit 41 sends the (e)PDCCH Order to the eIMTA function-enabled user equipment on the downlink subframe set of the second TDD uplink-downlink configuration. In this way, because available downlink subframes in the TDD configuration that is notified in the signaling sent through the (e)PDCCH are more than available downlink subframes in a TDD configuration notified in an SIB1, the UE may have more opportunities to receive the (e)PDCCH Order, thereby reducing a random access delay and improving scheduling flexibility of the base station. Alternatively, the base station may also send the (e)PDCCH Order to the eIMTA function-enabled user equipment on a downlink subframe set of the first TDD uplink-downlink configuration.

In this embodiment of the present invention, the downlink subframe set may include a special subframe. When the base station sends the (e)PDCCH Order to the eIMTA function-enabled user equipment on the downlink subframe set of the second TDD uplink-downlink configuration, if a corresponding subframe type that may be indicated in the TDD uplink-downlink configuration is a downlink subframe, the UE may receive other downlink data according to the downlink subframe type. The situation is applicable to listening, in a special subframe, to other messages sent by the base station, which is involved below.

The sending unit 41 is further configured to send, on the downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

The base station still does not know whether the UE is an eIMTA UE after receiving a preamble sent by the UE, and therefore the sending unit 41 sends the DCI scrambled by using the RA-RNTI to the UE in downlink subframes or a special subframe corresponding to the TDD configuration notified in the SIB1, thereby ensuring that all UEs can correctly receive the DCI.

The receiving unit 42 is configured to receive a random access message 3, which is sent by the eIMTA function-enabled user equipment in an uplink subframe determined according to the first TDD uplink-downlink configuration.

The sending unit 41 is further configured to send a contention resolution message to the eIMTA function-enabled user equipment on the downlink subframe set of the second TDD uplink-downlink configuration.

Because the base station has already recognized whether the UE is an eIMTA function-enabled user equipment or a user equipment that does not enable an eIMTA function after receiving the random access message 3 sent by the UE, and when the UE is an eIMTA function-enabled user equipment, whether to use the TDD uplink-downlink configuration that is notified in the signaling sent through the (e)PDCCH, preferably, the sending unit 41 sends the contention resolution message to the eIMTA function-enabled user equipment on the downlink subframe set of the second TDD uplink-downlink configuration. In this way, because available downlink subframes in the TDD uplink-downlink configuration that is notified in the signaling sent through the (e)PDCCH are more than available downlink subframes in the TDD configuration notified in the SIB1, the UE may have more opportunities to receive the contention resolution message, thereby reducing a random access delay and improving scheduling flexibility of the base station. Alternatively, the base station may also send the contention resolution message to the eIMTA function-enabled user equipment on the downlink subframe set of the first TDD uplink-downlink configuration.

According to the base station provided in this embodiment of the present invention, both a user equipment that does not enable an eIMTA function and an eIMTA function-enabled user equipment receive and send messages in a random access process by uniformly using an uplink subframe determined according to an uplink-downlink configuration that is included in signaling sent through a physical downlink shared channel, so that a base station can accurately receive random access messages sent by the user equipment that does not enable an eIMTA function and the eIMTA function-enabled user equipment; and further, a random access delay can be reduced and scheduling flexibility of the base station can be improved.

Figure 16:
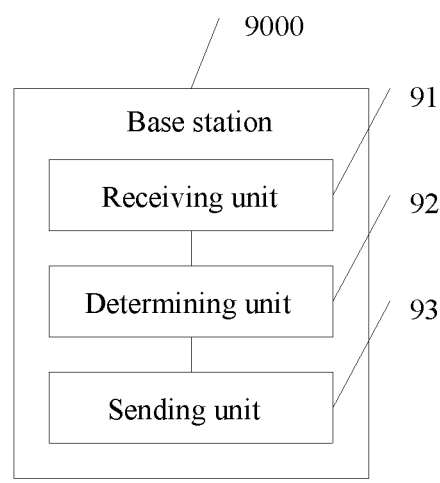
FIG. 16 is a schematic structural diagram of a third embodiment of a base station according to the present invention.

FIG. 16 is a schematic structural diagram of a third embodiment of a base station according to the present invention. As shown in FIG. 16, the base station 9000 includes a receiving unit 91, a determining unit 92, and a sending unit 93.

The receiving unit 91 is configured to receive a pre-configured pilot sent by a user equipment, or a reserved pilot in a pilot set, or a pilot sent through a pre-configured physical random access channel PRACH.

The determining unit 92 is configured to determine that the user equipment is an eIMTA function-enabled user equipment.

The sending unit 93 is configured to send signaling to the eIMTA function-enabled user equipment through a physical downlink control channel PDCCH or an enhanced physical downlink control channel ePDCCH, where the signaling includes a time division duplexing TDD uplink-downlink configuration.

The receiving unit 91 is further configured to receive a random access message 3, which is sent by the eIMTA function-enabled user equipment, in an uplink subframe determined according to the TDD uplink-downlink configuration by the eIMTA function-enabled user equipment, where the random access message is sent by the eIMTA function-enabled user equipment.

For the eIMTA UE, the base station configures a new PRACH resource or a new preamble, or reserves a part of preambles in an original preamble set.

In this way, when the eIMTA UE uses the new PRACH resource, or the new preamble, or the reserved part of preambles in the original preamble set to perform a random access process, the base station notifies the PRACH resource, or the new preamble, or reserves the part of preambles in the original preamble set, to determine that the UE is an eIMTA UE. Therefore, the random access message 3 may be received according to a TDD configuration notified in (e)PDCCH signaling. Because the TDD configuration notified in the (e)PDCCH signaling represents a configuration that is most suitable for system performance, performance of the random access process can be improved when the TDD configuration notified in the (e)PDCCH signaling is used to execute the random access process. However, a non-eIMTA UE receives the random access message 3 according to a TDD uplink-downlink configuration notified in an SIB1, so that the base station accurately receives the random access messages 3 sent by the eIMTA function-enabled user equipment and the user equipment that does not enable an eIMTA function.

It is understandable that, the new PRACH resource, or the new preamble, or the reserved part of preambles in the original preamble set may be configured for the UE by means of a system broadcast message, a dedicated RRC message or physical layer signaling, MAC layer signaling, and the like.

According to the base station provided in this embodiment of the present invention, a preamble is sent to a base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function.

Figure 17:
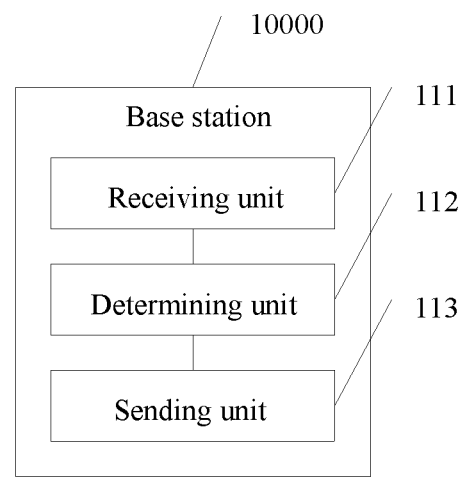
FIG. 17 is a schematic structural diagram of a fourth embodiment of a base station according to the present invention.

FIG. 17 is a schematic structural diagram of a fourth embodiment of a base station according to the present invention. As shown in FIG. 17, the base station 10000 includes a sending unit 113, a receiving unit 111, and a determining unit 112.

The sending unit 113 is configured to send a configuration notification to an eIMTA function-enabled user equipment in a predetermined manner, where the configuration notification includes any one of the following: a pre-configured physical random access channel PRACH, a pre-configured pilot, or a reserved pilot in a pilot set.

The receiving unit 111 is configured to receive the pre-configured pilot sent by the eIMTA function-enabled user equipment, or the reserved pilot in the pilot set, or a pilot sent through the PRACH.

The determining unit 112 is configured to determine that the user equipment is an eIMTA function-enabled user equipment.

The sending unit 113 is further configured to send signaling to the eIMTA function-enabled user equipment through a physical downlink control channel PDCCH or an enhanced physical downlink control channel ePDCCH, where the signaling includes a time division duplexing TDD uplink-downlink configuration.

The sending unit 113 is further configured to send a random access response message to the eIMTA function-enabled user equipment on a downlink subframe set of the TDD uplink-downlink configuration.

The receiving unit 111 is further configured to receive a random access message 3 in an uplink subframe determined according to the TDD uplink-downlink configuration by the eIMTA function-enabled user equipment, where the random access message is sent by the eIMTA function-enabled user equipment.

The sending unit 113 is further configured to send a contention resolution message to the eIMTA function-enabled user equipment on the downlink subframe set of the TDD uplink-downlink configuration.

A difference between this embodiment and the foregoing embodiment lies in that, the base station determines that the UE is an eIMTA UE according to the new PRACH resource, or the new preamble, or the reserved part of preambles in the original preamble set. Therefore, a subsequent random access response message, the random access message 3, and the contention resolution message may all be sent or received according to a TDD configuration notified in (e)PDCCH signaling.

According to the base station provided in this embodiment of the present invention, a preamble is sent to the base station according to a new PRACH resource pre-configured by the base station or a new preamble or a reserved part of preambles in an original preamble set, to enable the base station to determine that the user equipment is an eIMTA function-enabled user equipment, so that the base station accurately receives random access messages 3 sent by the eIMTA function-enabled user equipment and a user equipment that does not enable an eIMTA function; and further, a random access delay can be reduced and scheduling flexibility of the base station can be improved.

Figure 18:
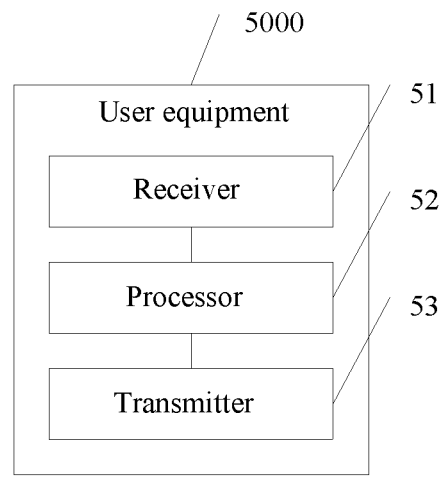
FIG. 18 is a schematic structural diagram of a fifth embodiment of a user equipment according to the present invention.

FIG. 18 is a schematic structural diagram of a fifth embodiment of a user equipment according to the present invention. As shown in FIG. 18, the user equipment 5000 includes:

a receiver 51, a processor 52, and a transmitter 53, where
the receiver is configured to receive first signaling, which is sent by a base station to an eIMTA function-enabled user equipment through a physical downlink shared channel PDSCH, and receive second signaling, which is sent by the base station to the eIMTA function-enabled user equipment through a physical downlink control channel PDCCH or an enhanced physical downlink control channel ePDCCH, where the first signaling includes a first time division duplexing TDD uplink-downlink configuration;

the processor is configured to determine, according to the first TDD uplink-downlink configuration, an uplink subframe for sending a random access message 3; and the transmitter is configured to send the random access message 3 to the base station in the determined uplink subframe.

In some feasible implementation manners, before the transmitter executes the step of sending the random access message 3 to the base station in the determined uplink subframe, the transmitter is further configured to execute the following step:

sending a preamble to the base station on an uplink subframe set of the first TDD uplink-downlink configuration.

In some feasible implementation manners, before the transmitter executes the step of sending a preamble to the base station on an uplink subframe set of the first TDD uplink-downlink configuration, the receiver is further configured to execute the following step:

listening, on a downlink subframe set of the second TDD uplink-downlink configuration, to a physical downlink control channel order PDCCH Order or an enhanced physical downlink control channel order ePDCCH Order sent by the base station; or listening, on a downlink subframe set of the first TDD uplink-downlink configuration, to a PDCCH Order or an ePDCCH Order sent by the base station.

In some feasible implementation manners, before the transmitter executes the step of sending the random access message 3 to the base station in the determined uplink subframe, the receiver is further configured to execute the following step:

listening, on the downlink subframe set of the first TDD uplink-downlink configuration, to downlink control information DCI that is sent by the base station through the PDCCH or the ePDCCH and is scrambled by using a random access-radio network temporary identifier RA-RNTI.

In some feasible implementation manners, after the transmitter executes the step of sending the random access message 3 to the base station in the determined uplink subframe, the receiver is further configured to execute the following step:

receiving, on the downlink subframe set of the second TDD uplink-downlink configuration, a contention resolution message sent by the base station; or receiving, on the downlink subframe set of the first TDD uplink-downlink configuration, a contention resolution message sent by the base station.

In some feasible implementation manners, the first signaling is a system information block 1.

According to the user equipment provided in this embodiment of the present invention, both a user equipment that does not enable an eIMTA function and an eIMTA function-enabled user equipment send random access messages 3 by uniformly using an uplink subframe determined according to an uplink-downlink configuration that is included in signaling sent through a physical downlink shared channel, so that a base station can accurately receive the random access messages 3 sent by the user equipment that does not enable an eIMTA function and the eIMTA function-enabled user equipment, and problems of power overhead and uplink interference that are caused when the eIMTA function-enabled user equipment determines a transmission time of a random access message 3 according to a second TDD uplink-downlink configuration and sends the random access message 3 are reduced; and further, a random access delay can be reduced and scheduling flexibility of the base station can be improved.

Figure 19:
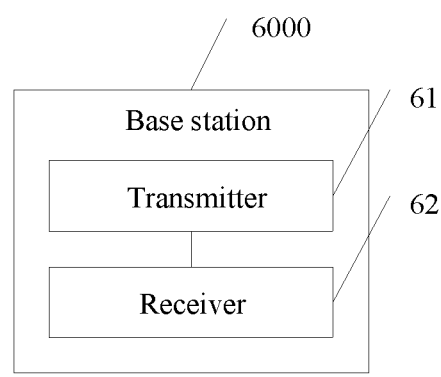
FIG. 19 is a schematic structural diagram of an embodiment of a base station according to the present invention.

FIG. 19 is a schematic structural diagram of an embodiment of a base station according to the present invention. As shown in FIG. 19, the base station 6000 includes:

a transmitter 61 and a receiver 62, where the transmitter is configured to send first signaling to an eIMTA function-enabled user equipment through a physical downlink shared channel PDSCH, and send second signaling to the eIMTA function-enabled user equipment through a physical downlink control channel PDCCH or an enhanced physical downlink control channel ePDCCH, where the first signaling includes a first time division duplexing TDD uplink-downlink configuration, and the second signaling includes a second TDD uplink-downlink configuration; and the receiver is configured to receive a random access message 3, which is sent by the eIMTA function-enabled user equipment in an uplink subframe determined according to the first TDD uplink-downlink configuration.

In some feasible implementation manners, before the receiver executes the step of receiving a random access message 3, which is sent by the eIMTA function-enabled user equipment in an uplink subframe determined according to the first TDD uplink-downlink configuration, the transmitter is further configured to execute the following step:

sending a physical downlink control channel order PDCCH Order or an enhanced physical downlink control channel order ePDCCH Order to the eIMTA function-enabled user equipment on a downlink subframe set of the second TDD uplink-downlink configuration; or sending a PDCCH Order or an ePDCCH Order to the eIMTA function-enabled user equipment on a downlink subframe set of the first TDD uplink-downlink configuration.

In some feasible implementation manners, before the receiver executes the step of receiving a random access message 3, which is sent by the eIMTA function-enabled user equipment in a first uplink subframe determined according to the first TDD uplink-downlink configuration, the transmitter is further configured to execute the following step:

sending, on the downlink subframe set of the first TDD uplink-downlink configuration, downlink control information DCI scrambled by using a random access-radio network temporary identifier RA-RNTI to the eIMTA function-enabled user equipment through the PDCCH or the ePDCCH.

In some feasible implementation manners, after the receiver executes the step of receiving a random access message 3, which is sent by the eIMTA function-enabled user equipment in a first uplink subframe determined according to the first TDD uplink-downlink configuration, the transmitter is further configured to execute the following step:

sending a contention resolution message to the eIMTA function-enabled user equipment on the downlink subframe set of the second TDD uplink-downlink configuration; or sending a contention resolution message to the eIMTA function-enabled user equipment on the downlink subframe set of the first TDD uplink-downlink configuration. In some feasible implementation manners, the first signaling is a system information block 1.

According to the base station provided in this embodiment of the present invention, both a user equipment that does not enable an eIMTA function and an eIMTA function-enabled user equipment receive and send messages in a random access process by uniformly using an uplink subframe determined according to an uplink-downlink configuration that is included in signaling sent through a physical downlink shared channel, so that a base station can accurately receive random access messages sent by the user equipment that does not enable an eIMTA function and the eIMTA function-enabled user equipment; and further, a random access delay can be reduced and scheduling flexibility of the base station can be improved.

It may be clearly understood by a person skilled in the art that, for the purpose of convenient and brief description, for a detailed working process of the foregoing device and module, reference may be made to a corresponding process in the foregoing method embodiments, and details are not described herein again.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communications interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Based on the foregoing descriptions of the embodiments, a person skilled in the art may clearly understand that the present invention may be implemented by software in addition to a necessary hardware platform or by hardware only. Based on such an understanding, the technical solutions of the present invention essentially or the part contributing to the prior art may be implemented in a form of a software device. The computer software device is stored in a computer readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the present technical solution. Any modification, equivalent replacement and improvement made without departing from the spirit and principle of the present invention shall fall within the protection scope of the present technical solution.

What is claimed is:

1. A method comprising:
   receiving, by a user equipment, first signaling from a base station through a physical downlink shared channel (PDSCH), and receiving, by the user equipment, second signaling from the base station through a physical downlink control channel (PDCCH) or an enhanced physical downlink control channel (ePDCCH), wherein the first signaling comprises a first time division duplexing (TDD) uplink-downlink configuration, and the second signaling comprises a second TDD uplink-downlink configuration;
   when both the first signaling comprising the first TDD uplink-downlink configuration and the second signaling comprising the second TDD uplink-downlink configuration are received by the user equipment, sending, by the user equipment, a random access message to the base station in a first uplink subframe within a first uplink subframe set of the first TDD uplink-downlink configuration, rather than according to the second TDD uplink-downlink configuration; and
   when that both the first signaling comprising the first TDD uplink-downlink configuration and the second signaling comprising the second TDD uplink-downlink configuration are received by the user equipment, after accessing the base station, sending, by the user equipment, data in a second uplink subframe within a second uplink subframe set of the second TDD uplink-downlink configuration or receiving, by the user equipment, data in a first downlink subframe within a downlink subframe set of the second TDD uplink-downlink configuration.

2. The method according to claim 1, wherein before the sending the random access message to the base station, further comprising:
   sending, by the user equipment, a preamble to the base station on a third uplink subframe within the first uplink subframe set of the first TDD uplink-downlink configuration.

3. The method according to claim 2, wherein before the sending a preamble to the base station, further comprising:
   listening, by the user equipment on a second downlink subframe set of the first TDD uplink-downlink configuration, to a PDCCH Order or an ePDCCH Order sent by the base station.

4. The method according to claim 1, wherein before the sending the random access message to the base station, further comprising:
   listening, by the user equipment on a second downlink subframe set of the first TDD uplink-downlink configuration, to downlink control information (DCI) that is sent by the base station through the PDCCH or the ePDCCH and is scrambled by a random access-radio network temporary identifier (RA-RNTI).

5. The method according to claim 1, wherein after the sending the random access message, further comprising:
   receiving, by the user equipment on a third downlink subframe within a second downlink subframe set of the first TDD uplink-downlink configuration, a contention resolution message from the base station.

6. The method according to claim 1, wherein the first signaling is a system information block.

7. An apparatus comprising:
   a storage medium including executable instructions; and
   a processor;
   wherein the executable instructions, when executed by the processor, cause the apparatus to:
   identify a first time division duplexing (TDD) uplink-downlink configuration from first signaling, the first signaling being received from a base station through a physical downlink shared channel (PDSCH), and identify a second TDD uplink-downlink configuration from second signaling, the second signaling being received from the base station through a physical downlink control channel (PDCCH) or an enhanced physical downlink control channel (ePDCCH);

when both the first signaling comprising the first TDD uplink-downlink configuration and the second signaling comprising the second TDD uplink-downlink configuration are received, send a random access message to the base station in a first uplink subframe within a first uplink subframe set of the first TDD uplink-downlink configuration, rather than according to the second TDD uplink-downlink configuration; and when both the first signaling comprising the first TDD uplink-downlink configuration and the second signaling comprising the second TDD uplink-downlink configuration are received by the user equipment, send data in a second uplink subframe within a second uplink subframe set of the second TDD uplink-downlink configuration or detecting data in a first downlink subframe within a downlink subframe set of the second TDD uplink-downlink configuration.

8. The apparatus according to claim 7, wherein the executable instructions, when executed by the processor, further cause the apparatus to:

before sending the random access message to the base station, cause the transmitter to send a preamble to the base station on a third uplink subframe within the first uplink subframe set of the first TDD uplink-downlink configuration.

9. The apparatus according to claim 8, wherein the executable instructions, when executed by the processor, further cause the apparatus to:

before sending a preamble to the base station, listen, on a second downlink subframe set of the first TDD uplink-downlink configuration, to a PDCCH Order or an ePDCCH Order sent by the base station.

10. The apparatus according to claim 7, wherein the executable instructions, when executed by the processor, further cause the apparatus to:

before sending the random access message to the base station, listen, on a second downlink subframe set of the first TDD uplink-downlink configuration, to downlink control information (DCI) that is sent by the base station through the PDCCH or the ePDCCH and is scrambled by a random access-radio network temporary identifier (RA-RNTI).

11. The apparatus according to claim 7, wherein the executable instructions, when executed by the processor, further cause the apparatus to:

after sending the random access message, detecting, on a third downlink subframe within a second downlink subframe set of the first TDD uplink-downlink configuration, a contention resolution message from the base station.

12. The apparatus according to claim 7, wherein the first signaling is a system information block.

13. A non-transitory computer-readable medium storing computer instructions that, when executed by one or more hardware processors, cause the one or more hardware processors to:

receive first signaling through a physical downlink shared channel (PDSCH), and receive second signaling through a physical downlink control channel (PDCCH) or an enhanced physical downlink control channel (ePDCCH), wherein the first signaling comprises a first time division duplexing (TDD) uplink-downlink configuration, and the second signaling comprises a second TDD uplink-downlink configuration;

when both the first signaling comprising the first TDD uplink-downlink configuration and the second signaling comprising the second TDD uplink-downlink configuration are received by the user equipment, send a random access message in a first uplink subframe within a first uplink subframe set of the first TDD uplink-downlink configuration, rather than according to the second TDD uplink-downlink configuration; and when both the first signaling comprising the first TDD uplink-downlink configuration and the second signaling comprising the second TDD uplink-downlink configuration are received by the user equipment, send data in a second uplink subframe within a second uplink subframe set of the second TDD uplink-downlink configuration or receive data in a first downlink subframe within a downlink subframe set of the second TDD uplink-downlink configuration.

14. The non-transitory computer-readable medium according to claim 13, wherein the computer instructions further cause the one or more hardware processors to:

before sending the random access message, send a preamble on a third uplink subframe within the first uplink subframe set of the first TDD uplink-downlink configuration.

15. The non-transitory computer-readable medium according to claim 14, wherein the computer instructions further cause the one or more hardware processors to:

before send the preamble, listen to a PDCCH Order or an ePDCCH Order on a second downlink subframe set of the first TDD uplink-downlink configuration.

16. The non-transitory computer-readable medium according to claim 14, wherein the computer instructions further cause the one or more hardware processors to:

before sending the random access message, listen, on a second downlink subframe set of the first TDD uplink-downlink configuration, to downlink control information (DCI) that is sent by the base station through the PDCCH or the ePDCCH and is scrambled by a random access-radio network temporary identifier (RA-RNTI).

17. The non-transitory computer-readable medium according to claim 13, wherein the computer instructions further cause the one or more hardware processors to:

after sending the random access message, receive a contention resolution message on a third downlink subframe within a second downlink subframe set of the first TDD uplink-downlink configuration.

18. The non-transitory computer-readable medium according to claim 13, wherein the first signaling is a system information block.

* * * * *